US006518334B1

(12) United States Patent
Calhoun et al.

(10) Patent No.: US 6,518,334 B1
(45) Date of Patent: Feb. 11, 2003

(54) PREPARATION AND USE OF DISPERSIONS OF BLENDED POLYCARBOXYPOLYAMIDE RESINS AND ALKALI DISPERSIBLE RESINS AND COMPOSITIONS THEREOF

(75) Inventors: Glenn C. Calhoun, Racine, WI (US); Michael T. Sarkis, Racine, WI (US)

(73) Assignee: JohnsonDiversey, Inc., Sturtevant, WI (US)

( * ) Notice: Subject to any disclaimer, the term of this patent is extended or adjusted under 35 U.S.C. 154(b) by 0 days.

(21) Appl. No.: 09/532,597

(22) Filed: Mar. 22, 2000

Related U.S. Application Data

(63) Continuation-in-part of application No. 08/770,206, filed on Dec. 19, 1996, now abandoned.

(51) Int. Cl.$^7$ .................................................. C08L 3/02
(52) U.S. Cl. ..................... 524/47; 524/77; 524/104; 524/140; 524/270; 524/271; 524/272; 524/276; 524/277; 524/284; 524/292; 524/296; 524/297; 524/317; 524/369; 524/377; 524/457; 524/458; 524/475; 524/487; 524/514; 524/538; 525/179; 525/180; 525/181; 525/182; 525/183; 525/184
(58) Field of Search ....................... 524/514, 538, 524/271, 272, 270, 47, 77, 277, 276, 104, 140, 284, 292, 296, 297, 317, 369, 377, 457, 458, 475, 487; 525/179, 180, 181, 183, 182, 184

(56) References Cited

U.S. PATENT DOCUMENTS

| | | | |
|---|---|---|---|
| 2,824,848 A | 2/1958 | Wittcoff | 524/514 |
| 2,926,117 A | 2/1960 | Wittcoff | 162/168 |
| 3,582,507 A | 6/1971 | Peerman | 260/23 |
| 3,776,865 A | 12/1973 | Glaser | 260/18 N |
| 3,778,394 A | 12/1973 | Lovald et al. | 260/18 N |
| 3,804,881 A | 4/1974 | Bassett et al. | 260/470 A |
| 3,933,706 A | 1/1976 | Momiyama et al. | 260/22 S |
| 3,950,294 A | 4/1976 | Connelly et al. | 260/29.6 R |
| 4,018,733 A | 4/1977 | Lopez et al. | 524/514 |
| 4,365,041 A | 12/1982 | Okamoto et al. | 525/58 |
| 4,514,540 A | 4/1985 | Peck | 524/514 |
| 4,529,787 A | 7/1985 | Schmidt et al. | 526/317 |
| 4,602,058 A | 7/1986 | Graham et al. | 524/320 |
| 4,791,164 A | 12/1988 | Wichelhaus et al. | 524/514 |
| 4,810,747 A | 3/1989 | Bornack, Jr. et al. | 524/538 |
| 4,820,762 A | 4/1989 | Tsaur | 524/460 |
| 4,839,413 A | 6/1989 | Kiehlbauch et al. | 524/460 |
| 4,853,421 A | 8/1989 | Hayes | 523/223 |
| 4,870,139 A | 9/1989 | Kveglis et al. | 525/420.5 |
| 4,879,333 A | 11/1989 | Frazee | 524/460 |
| 4,886,844 A | 12/1989 | Hayes | 523/223 |
| 4,923,919 A | 5/1990 | Frazee | 524/460 |
| 4,954,558 A | 9/1990 | Tsaur | 525/460 |
| 4,973,617 A | 11/1990 | Incontro et al. | 524/187 |
| 4,980,408 A | 12/1990 | Chan | 524/504 |
| 4,992,500 A | 2/1991 | Klauck et al. | 524/270 |
| 5,025,043 A | 6/1991 | Smith | 523/326 |
| 5,026,755 A | 6/1991 | Kveglis et al. | 524/389 |
| 5,095,058 A | 3/1992 | Smith et al. | 524/238 |
| 5,109,054 A | 4/1992 | Smith | 524/514 |
| 5,180,782 A | 1/1993 | Stone et al. | 525/183 |
| 5,183,847 A | 2/1993 | El-Hefnawi et al. | 525/54.44 |
| 5,216,064 A | 6/1993 | Rivera et al. | 524/457 |
| 5,236,996 A | 8/1993 | Smith | 524/608 |
| 5,277,978 A | 1/1994 | Feustel et al. | 428/402 |
| 5,306,762 A | 4/1994 | Hutter | 524/457 |
| 5,349,009 A | 9/1994 | Furlan | 524/563 |
| 5,369,210 A | 11/1994 | George et al. | 528/293 |
| 5,387,638 A | 2/1995 | Nakamae et al. | 524/503 |
| 5,399,612 A | 3/1995 | Calhoun | 524/506 |
| 5,407,985 A | 4/1995 | Smith | 524/238 |
| 5,439,960 A | 8/1995 | Mudge et al. | 524/111 |
| 5,496,876 A | 3/1996 | Jacquemin et al. | 524/505 |
| 5,510,405 A | 4/1996 | Heucher et al. | 524/514 |
| 5,539,042 A | 7/1996 | Birch | 524/503 |
| 5,548,017 A | 8/1996 | Distefano | 524/514 |

FOREIGN PATENT DOCUMENTS

| | | |
|---|---|---|
| EP | 359129 A2 | 3/1990 |
| EP | 0 466 404 A1 | 1/1992 |
| JP | 57053512 | 3/1982 |
| JP | 58-79164 | 4/1983 |
| WO | WO 92/02583 | 2/1992 |
| WO | 92/16579 | 10/1992 |

OTHER PUBLICATIONS

*American Paint& Coatings Journal* of May 9, 1994, "Synergism with Urethanes and Water–Borne Acrylics" by A. Banov, Pp. 47–48; "Water–Borne Urethane/Acrylic Latex Blends, Synergism and Lower VOCS" by Dr. R. Coogan, J. Bilancieri & G. Pollano, Pgs. 49–54; "Acrylic Lacquer Water–Borne Dispersions: Very Low VOCS, Lacquer–Typer Performance" by R. Johnson, pp. 55–59.

*Primary Examiner*—Judy M. Reddick
(74) *Attorney, Agent, or Firm*—Neil E. Hamilton; Warren R. Bovee; Renee J. Rymarz

(57) ABSTRACT

This invention relates to polymer blends comprising a polycarboxypolyamide resin with an alkali dispersible resin. This invention also relates to the use of the polymer blends to prepare aqueous dispersions. The aqueous dispersions were obtained by heating polycarboxypolyamide resins with alkali dispersible resins in an aqueous medium. The invention further relates to coating compositions containing the aqueous dispersions. Such coating compositions include inks, floor finishes, overprint varnishes, sizing, paints and adhesives.

56 Claims, No Drawings

PREPARATION AND USE OF DISPERSIONS OF BLENDED POLYCARBOXYPOLYAMIDE RESINS AND ALKALI DISPERSIBLE RESINS AND COMPOSITIONS THEREOF

CROSS REFERENCE TO RELATED APPLICATIONS

This is a continuation-in-part of Ser. No. 08/770,206 filed Dec. 19, 1996, now abandoned.

STATEMENT REGARDING FEDERALLY SPONSORED RESEARCH OR DEVELOPMENT

None.

BACKGROUND OF THE INVENTION

1. Field of the Invention

This invention is related to the preparation of aqueous dispersions of polymer blends. The polymer blends are composed of polycarboxypolyamide resins and alkali dispersible resins. The invention is further related to coatings, such as inks, floor finishes, paints, overprint varnishes, sizings, adhesives and the like employing the dispersions of the polymer blends.

2. Related Background Art

The preparation and use of alkali soluble resins are is closed in U.S. Pat. No. 5,183,847. These resins are carboxylated polyamide/acrylic resins and are synthesized in a two step fusion process. The polyamide is first condensed with a carboxylated rosin (e.g., maleated or fumarated rosin) at elevated temperatures in the range 200°–240° C. and this fusion product is further condensed with an acrylic or styrene/acrylic copolymer at 230° C. The resulting fusion resin can be dissolved or dispersed in water by neutralizing the acid groups with ammonia and/or amines.

In U.S. Pat. No. 5,180,782 compositions and methods of producing ammoniated water-soluble resins such as carboxylated polyamide-acrylic, carboxylated polyamide-styrene-acrylic or carboxylated polyamide-styrene-maleic resins are disclosed. The carboxylated polyamide is first prepared by the well-known procedure of heat fusion of a carboxylate rosin with a polyamide resin. The carboxylated polyamides resin must have an acid number of 65 or higher. The polyamide-acrylic resin is then prepared by blending, preferably at a temperature of 60 to 80° C., an aqueous solution of the carboxylated polyamide fusion product with an ammoniated aqueous solution of styrene-acrylic, styrene-maleic or all-acrylic resin until the two resins are compatible. Also described are resins synthesized with acid numbers in the range of 80–150 by a high temperature (180–250° C.) fusion reaction.

The use of anionic polyamide resin suspensoids in the preparation of paper products is disclosed in U.S. Pat. No. 2,926,117. The suspensoids employed are derived from polyamides prepared by reacting polymeric fatty acids with polyalkylene polyamines (e.g. diethylene triamine, triethylene tetraamine etc.). The polyamides are required to have high acid number of at least 50 and preferably 75–100. The polyamides are dispersed in an aqueous medium by reaction of the free carboxy groups with an aqueous alkali (e.g., inorganic and organic bases). The amount of alkali employed is only part of the quantity that would be required to completely neutralize the acid (usually, a quantity equivalent to an acid number of 25 to 50 is sufficient).

The dispersion process disclosed in U.S. Pat. No. 2,926,117 is carried out by mixing the resin with an aqueous alkali and heating the mixture. The resin disperses readily to form a stable suspensoid.

An example of a water dispersible polyamide blend is disclosed in U.S. Pat. No. 4,810,747. The polyamide blend is composed of two polyamide resins. The first resin comprises the reaction product of dibasic derivatives of fatty acids, monobasic acid and organic polyamides with an acid number of 20 to 50. The second resin comprises isophthalic acid, dibasic derivatives of fatty acids and organic polyamides with an acid number of 50 to 120. When the two resins are mixed the resulting polymer blend is water dispersible.

U.S. Pat. No. 4,973,617 disclose water-borne printing ink compositions based on acrylic resins and carboxylated rosin modified polyamides. The carboxylated rosin modified polyamides are prepared by a high temperature heat fusion process between a carboxylated rosin and polyamide polymer.

While many examples of aqueous resin blends containing polyamides modified by fusion reaction with a carboxylated resin are known, there remains a need for aqueous dispersions of polyamide resins that have relatively low acid number. Additionally, the polyamide resins should also be easily dispersed in basic aqueous solutions without large amounts of alcohol and have excellent storage stability.

SUMMARY OF THE INVENTION

This invention relates to polymer blends comprising a polycarboxypolyamide resin with an alkali dispersible resin. This invention also relates to the use of the polymer blends to prepare aqueous dispersions. The aqueous dispersions are generally comprised of 20 to 50 percent non-volatile material and 50 to 80 percent water. The aqueous dispersions are obtained by heating the polycarboxypolyamide resins with alkali dispersible resins in an aqueous medium. The dispersions have very fine particle size (i.e., less than 100 nm) and are useful as components of coatings (e.g., paints, varnishes, paper sizes, floor finishes, inks and adhesives, etc.).

In one preferred embodiment of the subject invention the polymer blend composition is useful in an aqueous dispersion and comprises: (a) a water insoluble polycarboxypolyamide resin in an amount from about 30 to about 90 percent by weight of the blend, having an acid number from about 25 to about 60; and (b) an alkali dispersible resin in an amount from about 10 to about 70 percent by weight of the blend. The polycarboxypolyamide resin has a number-average molecular weight of about 2,000 to about 20,000. Typically, the alkali dispersion resin has an acid number from about 75 to about 500 with a number-average molecular weight of about 500 to about 20,000.

The invention also relates to a blended polymer aqueous dispersion comprising:
(a) a water insoulible polycarboxypolyamide resin in an amount from about 30 to about 90 percent by weight of the total solids of the dispersion, having an acid number from about 25 to about 60;
(b) an alkali dispersible resin in an amount from about 10 to about 70 percent by weight of the total solids of the dispersion;
(c) at least one nonionic or anionic surfactant in an amount from about 0 to about 10 percent by weight of the total solids of the dispersion;
(d) a base in an amount from about 70 to about 150 percent of the amount required to neutralize acid functionality of the components (a) and (b); and
(e) water.

This invention also relates to methods for preparing aqueous dispersions of the disclosed polymer blends. Yet another embodiment of this invention is directed to coating compositions containing the aqueous dispersions disclosed in the subject application. These compositions include, for example, paper sizing agents, thermoset coatings, latexes and emulsion polymers, floor finishes, inks, adhesives and overprint varnishes. Another embodiment of this invention includes emulsion support resins prepared with the aqueous dispersions of this invention.

DETAILED DESCRIPTION OF THE INVENTION

This invention relates to polymer blends of water insoluble polycarboxypolyamide resins which are readily dispersed in aqueous media in the presence of alkali dispersible resins. Additionally, the polymer blends may be comprised of nonionic or anionic surfactants.

Preferably, the polycarboxypolyamide resin comprises about 30 to about 90 percent of the total solids of the polymer blend composition. More preferably, the polycarboxypolyamide resin comprises about 50 to 80 percent of the total solids of the polymer blend.

The term "polycarboxypolyamide resin" means polyamide resins containing carboxylic acid functionality. Typically, the polycarboxypolyamide resins are formed as the result of a high temperature fusion reaction between a polyamide resin and a carboxylic acid containing resin or as the result of a chemical condensation reaction between an excess of a carboxylic acid resin material (diacid) and an amine resin material (diamine).

The number-average molecular weight (Mn) of the polycarboxypolyamides generally range from about 2,000 to about 20,000. Preferably, the polycarboxypolyamides have acid numbers ranging from about 25 to about 60. More preferably, the polycarboxypolyamides have acid numbers ranging from about 35 to about 60. Most preferably, the polycarboxypolyamides have acid numbers ranging from about 45 to about 60.

The preparation of polycarboxypolyamides using condensation polymerization procedures for diacids and diamines is well-known in the art. The salt of the diamine and the diacid is formed when the diamine is added to molten diacid. At an elevated temperature (about 170–200° C.), the salt eliminates water to form an amide bond. The desired acid number is achieved by adjusting the equivalents of diacid and diamine used in the condensation reaction.

Dimer acids or polymeric fatty acids are well-known in the art as the adducts of unsaturated $C_{18}$-hydrocarbon acids. Typically, dimer acids are prepared from mixtures of oleic, linoleic, tall oil, or other fatty acids derived from vegetable and animal fats. Additionally, dimer acids are available commercially under a number of trademark names such as Empol™ from Henkel Corporation, Emery Group of Cincinnati, Ohio; Sylvadym™ from Arizona Chemical of Panama City, Fla.; Hystrenem from Humko, a division of Witco Corporation, of Memphis, Tenn.; and Unidyme™ from Union Camp Corporation of Jacksonville, Fla. Typically, these dimer acids are comprised of a mixture of about 70 to 95 percent $C_{36}$-diacid, 0 to 10 percent $C_{18}$-monoacid and 0 to 25 percent $C_{54}$-triacid.

In the subject invention dimer acids comprise about 50 to about 100 percent of the acid component of the polycarboxypolyamide. In one embodiment of the subject invention a dimer acid mixture with a higher fraction of trimer acid, e.g. Empol™ 1040, may be used in place of the diacid to control the molecular weight of the resulting polycarboxypolyamide resin.

Other useful diacids of the present invention may have the following structure HOOC—R—COOH and may be used to control the hydrophobicity and thermal properties of the polycarboxypolyamide resins, wherein R is alkylene, cycloalkylene or arylene. Examples of useful diacids are adipic acid, azelaic acid, suberic acid, sebacic acid, dodecanoic diacid, $C_{21}$-diacid such as Westvaco™ 1550 from Westvaco Chemicals of Charleston, S.C., terephthalic acid, isophthalic acid, phthalic acid and its anhydride, and cyclohexanedicarboxylic acids and anhydrides.

Triacids such as trimellitic anhydride and maleated or fumarated rosins may be used to modify the molecular weight and properties of the resulting polymers. Monofunctional acids such as propionic acid, stearic acid, oleic acid, tall oil fatty acid, benzoic acid, and rosin acids may be used to modify molecular weight or properties.

The diamines used in the preparation of the polycarboxypolyamide resins for the present invention may have the structure $H_2N$—R—$NH_2$, wherein R is alkylene, cycloalkylene or arylalkylene. Examples of appropriate diamines include but are not limited to the following, ethylene diamine, hexamethylene diamine, 2-methyl, 5-pentanediamine, m-xylylenediamine, 1,2-cyclohexanediamine and isophoronediamine. Diamines containing secondary amines can also be utilized, e.g., piperazine. Alkyl triamines such as diethylene triamine can be used to control the molecular weight of the resulting resins. Monofunctional amines such as cyclohexylamine and hexylamine may be used to control molecular weight or properties of the resulting resins. Low amounts of polyether diamines of the formula, $H_2N$—$(RO)_x$—$(R'O)_y$—$(RO)_z$—$RNH_2$ may also be used, wherein R and R' are independently alkylene, cycloalkylene, or arylalkylene, x+y+z=1 to about 70 and x, y and z can vary independently between 0 and 70.

The alkali dispersible resins (ADRs) employed in this invention include alkali soluble resins. Preferably, the ADRs employed in the subject invention comprise about 10 to about 70 percent of the total solids of the polymer blend. More preferably, the ADRs comprise about 20 to about 50 percent of the total solids of the polymer blend. Preferably, the ADRs have a Mn about 500 to about 20,000, more preferably from about 500 to about 10,000, and most preferably from about 500 to about 7000. Preferably, the ADRs have an acid number of about 75 to about 500, more preferably from about 75 to about 300 and most preferably from about 100 to about 250.

Preferably, the ADRs contain an amount of aliphatic or cycloaliphatic moieties in addition to the acid bearing moieties. More preferably, the ADRs are dibasic acid (e.g., fumaric acid or maleic anhydride) modified rosin and derivatives thereof (esters, primarily), shellacs, and polymers of acid functional ethylenically unsaturated monomers and other ethylenically unsaturated monomers.

Most preferably, the ADRs are polymers of acrylic acid, methacrylic acid or maleic anhydride and other ethylenically unsaturated monomers.

Suitable acid-functional ethylenically unsaturated monomers include but are not limited to aconitic acid, acrylic acid, beta-carboxymethyl acrylate, cinnamic acid, crotonic acid, fumaric acid, itaconic acid, maleic acid, methacrylic acid, and mixtures thereof. Also suitable are certain monomers that are said to contain so-called "latent" acid moieties, such as cyclic anhydrides. Accordingly, suitable cyclic anhydrides include but are not limited to itaconic anhydrides, maleic anhydride, and mixtures thereof.

Suitable aromatic ethylenically unsaturated monomers include but are not limited to styrene, α-methylstyrene, β-methylstyrene, cis-stilbene, trans-stilbene, para-methylstyrene, tert-butylstyrene, vinylnapthalene, and various mixtures and combinations thereof.

Suitable non-aromatic ethylenically unsaturated monomers include but are not limited to α-olefins; dienes; vinyl esters and ethers; $C_1$ to $C_{20}$ acrylate and methacrylate esters; acrylamides and methacrylamides; vinyl amides; and various mixtures and combinations thereof.

A preferred alkali soluble resin includes a polymer of acrylic acid and at least one ethylenically unsaturated monomer selected from styrene, alpha-methyl styrene and $C_1$–$C_{20}$ alkyl acrylates and methacrylates.

This invention also relates to a method to disperse the polymer blend comprising a polycarboxypolyamide and an ADR in water using a base. The amount of the base used in the dispersion ranges from about 70 to about 150 percent of the calculated amount needed to neutralize the acid functionality present in the polymer blend. The base may be selected from the group consisting of hydroxides of Group I elements such as sodium, potassium or lithium; ammonia; amines such as ethanol amine, diethanol amine, triethanol amine, diethylethanol amine; and volatile amines. Preferably the base is a volatile amine such as ammonia, methylamine, diethylamine, trimethylamine, ethylamine, diethylamine, triethylamine, propylamine, isopropylamine, di-isopropylamine, dipropylamine, butylamine, sec-butylamine, tert-butylamine, 2-dimethylamino-2-methyl-1-propanol, dimethylethanol amine and various mixtures and combinations thereof. More preferably the base is ammonia.

The invention also relates to a method for preparing a blended polymer aqueous dispersion comprising the steps of:
(a) blending at a temperature from about 100° C. to about 190° C.;
  (i) a water insoluble polycarboxypolyamide resin in an amount from about 30 to about 90 percent by weight of the total solids of the dispersion, having an acid number from about 25 to about 60; and
  (ii) an alkali dispersible resin in an amount from about 10 to about 70 percent by weight of the total solids of the dispersion to form a polymer blend; and
(b) adding to said polymer blend:
  (i) at least one nonionic or anionic surfactant in an amount from about 0 to about 10 percent by weight of the total solids of the dispersion;
  (ii) a base in an amount from about 70 to about 150 percent of the amount required to neutralize acid functionality of the components (a)(i) and (a)(ii) to form a predispersion mixture; and
  (iii) water; and
(c) mixing said predispersion mixture at a temperature from about 25° C. to about 160° C. to form the blended polymer dispersion.

In the method described above the polycarboxypolyamide resin and an alkali dispersible resin are heated at a temperature high enough to liquify the two polymers to form a polymer blend. Preferably, the polycarboxypolyamide and the ADR are heated at a temperature between 100° C. and 190° C. to form a polymer blend. More preferably, the polycarboxypolyamide and the ADR are heated at a temperature between 140° C. and 190° C. to form a polymer blend. Most preferably, the polycarboxypolyamide and the ADR are heated at a temperature between 140° C. and 170° C. to form a polymer blend. The resulting polymer blend is added to an ammoniated water solution either in the presence or absence of at least one nonionic or anionic surfactant in an amount from about 0 to about 10 percent by weight of the blend to form a predispersion mixture. Preferably, the predispersion mixture is mixed at a temperature between about 25° C. and 160° C. for about one to four hours. More preferably, the predispersion mixture is mixed at a temperature between about 60° C. and 90° C. for about one to four hours. Most preferably, the predispersion mixture is mixed at a temperature of about 85° C. for about two hours.

The invention is also related to a method for preparing a blended polymer dispersion comprising the steps of:
(a) blending at a temperature from about 100° C. to about 190° C.;
  (i) a water insoluble polycarboxypolyamide resin in an amount from about 30 to about 90 percent by weight of the total solids of the dispersion, having an acid number from about 25 to about 60;
  (ii) an alkali dispersible resin in an amount from about 10 to about 70 percent by weight of the total solids of the dispersion; and
  (iii) at least one nonionic or anionic surfactant in an amount from about 0 to about 10 percent by weight of the total solids of the dispersion to form a polymer blend; and
(b) adding to said polymer blend:
  (i) a base in an amount from-about 70 to about 150 percent of the amount required to neutralize acid functionality of the components (a)(i) and (a)(ii) to form a predispersion mixture; and
  (ii) water; and
(c) mixing said predispersion mixture at a temperature from about 25° C. to about 160° C. to form the blended polymer dispersion.

The invention is further related to a method for preparing a blended polymer dispersion comprising the step of: blending at a temperature from about 60° C. to about 1600 C;
  (i) a water insoluble polycarboxypolyamide resin in an amount from about 30 to about 90 percent by weight of the total solids of the dispersion, having an acid number from about 25 to about 60;
  (ii) an alkali dispersible resin in an amount from about 10 to about 70 percent by weight of the total solids of the dispersion;
  (iii) at least one nonionic or anionic surfactant in an amount from about 0 to about 10 percent by weight of the total solids of the dispersion;
  (iv) a base in an amount from about 70 to about 150 percent of the amount required to neutralize acid functionality of the components (i) and (ii) to form the blended polymer dispersion; and
  (v) optionally water.

In the method for the preparation of the blended polymer dispersion described above, wherein the components (i)–(v) are mixed, the resulting mixture is heated at a temperature of about 60° C. to about 160° C. for about 1 to about 4 hours to form the desired dispersion. The water (v) may be present while heating or added after the step of heating. In a preferred embodiment for the preparation of the blended polymer dispersion the mixture is heated at 85° C. for about 2 hours to form the blended polymer dispersion.

In the methods disclosed herein the preparation of polymer blends may be carried out under an inert atmosphere. Suitable inert atmospheres include nitrogen or argon gases.

If desired, preparation of the polymer blends may be conducted under pressure.

Industrial Applicability

This invention is related to the preparation of industrially useful polycarboxypolyamide containing polymeric dispersions. The dispersions are prepared by mixing and heating two resins, that are compatible or partially compatible, in an aqueous medium. Typically, a polycarboxypolyamide resin with an acid number from about 25 to about 60 is mixed with an acrylic or carboxylated rosin ester resin having a higher acid number from about 75 to about 500 in the presence of an aqueous medium resulting in the formation of the dispersion. The dispersions have a high percentage of solids, excellent storage stability and may be formulated without environmentally harmful solvents. The stable dispersions have very fine particle size, e.g., less than 100 nm, and are useful as components of floor finishes, coatings, pigment dispersions, inks, paper sizing agents, adhesives, emulsion polymers and emulsion support resins.

Another embodiment of the invention is related to a water-based coating composition containing the above-described blended polymer aqueous dispersion and an emulsion polymer of at least one ethylenicallyunsaturated monomer, preferably at least two ethylenically unsaturated monomers selected from the group consisting of styrene, alpha-methyl styrene, $C_1$–$C_{20}$ alkyl acrylates and methacrylates and methacrylic acid. Particularly preferred ethylenically unsaturated monomers include styrene, butyl acrylate, alpha-methyl styrene, methylmethacrylate, methacrylic acid, butyl methacrylate, isobutyl methacrylate and 2-ethylhexyl acrylate. The preparation of such water-based coating compositions is well within the skill of those of ordinary skill in the art. Typical preparations of overprint varnishes, inks, coatings, floor finishes and adhesives are described below.

Overprint Varnishes

Overprint varnishes of this invention may be prepared using the aqueous dispersions of this invention and at least one emulsion polymer. Low molecular weight dispersible resins may be added to enhance gloss and printing qualities. Coalescing solvents or plasticizers may be added, if needed. Other additives, such as surfactants, waxes and wax emulsion, crosslinkers such as ZnO or aziridines, and defoamers, can be added to improve properties. Water and/or water miscible solvents can be added to adjust the viscosity of the overprint varnish formula.

Inks

Inks of this invention may be prepared using the aqueous dispersions of this invention in combination with a pigment or pigment dispersion and at least one emulsion polymer. Aqueous pigment dispersions are commercially available or can be produced by dispersing pigments in aqueous solutions of surfactants and/or low molecular weight alkali soluble resins, and in the case of certain pigments, such as titanium dioxide, in aqueous emulsion polymers. Coalescing solvents or plasticizers may be added, if needed. Other additives, such as surfactants, waxes and wax emulsions, crosslinkers such as ZnO or aziridines, and defoamers, can be added. Water and/or water miscible solvents can be added to adjust the viscosity of the ink formula.

Coatings

Coatings of this invention may be prepared in a manner very similar to inks. In some coating compositions, like wood coatings, no pigment is needed. Coalescing solvents or plasticizers may be added, if needed. Other additives, such as surfactants, waxes and wax emulsions, flow additives, thickeners, and defoamers, can be added. Water and/or water miscible solvents can be added to adjust the viscosity of the coating formula.

Adhesives

Adhesives of this invention may be prepared in a method similar to overprint varnishes. Adhesives include at least one emulsion polymer. Coalescing solvents or plasticizers may be added, if needed. Other additives, such as tackifiers, surfactants, waxes and wax emulsions, flow additives, thickeners, crosslinkers such as ZnO or aziridines, and defoamers, can be added to improve properties. Water and/or miscible solvents can be added to adjust the viscosity of the adhesive formula. See e.g., U.S. Pat. No. 5,349,009 and U.S. Pat. No. 5,439,960.

The invention also includes sizing agent compositions comprised of the blended polymer aqueous dispersion and starch. Amounts of blended polymer aqueous dispersion and starch are admixed to provide the desired sizing properties. Such amounts can be readily determined by one skilled in the art without undue experimentation.

The thermoset coating compositions of this invention include the blended polymer aqueous dispersion in combination with a crosslinking agent in an amount effective to provide the desired degree of crosslinking. Exemplary crosslinkers include melamine based crosslinkers and derivatives thereof which are readily available.

The invention is also directed to resin supported emulsion polymers prepared with the aqueous dispersions of this invention. A resin supported emulsion polymer may be prepared by polymerizing ethylenically unsaturated monomers in the presence of the water dispersible polymers of this invention. Exemplary ethylenically unsaturated monomers have been described previously herein. Water, at least one dispersion of a low molecular weight water dispersible polymer, and, optionally, at least one surfactant is added to a flask equipped with stirring means, a thermometer, and a condenser. This mixture is heated to the desired temperature under a low flow of dry nitrogen. A monomer mixture is prepared. An initiator, usually a persulfate salt, solution is prepared by dissolving the initiator in water.

At this point, a precharge of the monomer may be added, if desired. After a suitable hold period, the initiator solution is added to the hot aqueous resin mixture. The monomer is added dropwise to the hot aqueous resin mixture over a period of time required to maintain a good balance between monomer concentration and rate of polymerization. More initiator solution may be added at the end of the monomer addition, if desired. The reaction mixture is then held at the reaction temperature for a period of time to reduce the monomer concentration. The emulsion polymer is then cooled and filtered.

A particular preferred coating of this invention is a floor finish composition. A commercial floor finish requires a polymer to produce a film which protects the floor material it is applied to from deterioration. Such deterioration may result from scuffing, scratching, and black marking caused by people traffic, i.e., soles and heels of shoes, as well as wheeled vehicles, e.g., shopping carts, baby strollers, stocking carts, dollies, hand trucks and the like. In addition to flooring protection, a high gloss appearance is also mandatory for a floor finish product. In general, the two most important requirements of a floor finish composition are to impart gloss as well as resistance to scuffing and black heel marking to the coated flooring. It has been found that floor finish compositions of this invention meet those requirements.

The polymer components of the floor finishes of this invention result in a well coalesced film to achieve high gloss and resistance to scuffing and black heel marking. Besides the blended polycarboxypolyamide/alkali dispersible resin polymer aqueous dispersion of this invention, the floor finish compositions of this invention also include an emulsion polymer, a wax or wax dispersion, at least one coalescing aid and water.

If desired, an ionic crosslinking agent may also be employed as part of the floor finish composition to further enhance film durability. Usually, a general requirement of a floor finish composition is that the finish coating be easily and completely removed from the flooring material when desired. Non-permanent floor finishes are removable with commercial strippers composed of alkali and organic solvents. Since removability is generally desirable, ionic crosslinkers are preferred over organic crosslinkers since ionic crosslinking is reversible when floor finish coating compositions are subjected to commercial strippers.

The emulsion polymer employed in the floor finish composition of this invention is generally a styrene/acrylic or acrylic copolymer having a glass transition temperature (Tg) of greater than 50° C. (Jordan), preferably between about 50° C. to about 100° C., and most preferably about 65° C. to 95° C. The Tg of the styrene/acrylic or acrylic floor finish polymer effects the scuff and black heel mark resistance of the polymer film. Generally, styrene/acrylic or acrylic emulsion polymer having a relatively low Tg, e.g. <50° C. (Jordan), yield poorer scuff and black heel mark resistance properties than higher Tg analogs.

The emulsion polymer typically is prepared with an acid functional monomer, preferably methacrylic acid, in an amount between about 5 to about 30%, more preferably between about 15 to about 25% by weight of styrene/acrylic monomer. Generally, the amount of emulsion polymer admixed component to the blended polycarboxypolyamide/alkali dispersible resin polymer aqueous dispersion component, on a nonvolatile solids basis, of this invention is between about 5% to 95%, more preferably 40 to 95%, and most preferably 70 to 85% by weight of the total weight of the blended polycarboxypolyamide/alkali dispersible resin polymer aqueous dispersion and the emulsion polymer components.

The preparation of emulsion polymers is well known to those skilled in the art. Generally such emulsion polymers are prepared with ethylenically unsaturated monomers. Other components may include initiators, surfactants or emulsifying agents, amines (alkali), chain transer agents and multifunctional organic crosslinking agents.

Exemplary ethylen cally unsaturated monomers for preparing emulsion polymers in a latex system include alkenoic acids having 3 to 6 carbon atoms, such as acrylic acid, methacrylic acid, crotonic acid; alkenedioic acids, such as itaconic acid, maleic acid or fumaric acid or mixtures thereof. Additional exemplary ethylenically unsaturated monomers comprising monomeric units include but are not limited to α-olefins; dienes; viny: esters and ethers; $C_1$ to $C_{20}$ acrylate and methacrylate esters; acrylamides and methacrylamides; vinyl amides; styrene, α-methylstyrene, β-methylstyrene, cis-stilbene, trans-stilbene, para-methylstyrene, tert-buzylstyrene, vinylnapthalene, and various mixtures and combinations thereof.

Exemplary multi-functional comonomers that may be employed in emulsion polymers are polyethylenically unsaturated comonomers and include lower alkenyl ($C_1$ to $C_4$) lower alkenoates, for example vinyl crotonate, allyl acrylate, allyl methacrylate; di-lower a kenyl ($C_1$ to $C_4$) alkanedioates, for example, divinyl adipate, diallyl adipate; di-lower akienyl ($C_1$ to $C_4$) benzenedicarboxyiates, for example, diallyl phthalate; lower alkenediol ($C_1$ to $C_4$) di- or tri-lower alkenoates, for example, ethylene glycol diacrylate, ethylene glycol dimethacrylate, butanediol diacrylate, butanediol dimethacrylate; lower ($C_1$ to $C_4$) alkylene bisacrylamides and lower alkylene ($C_1$ to $C_4$) bis-methacrylamides, for example, methylene bis-acrylamide; triallyl cyanurate; and the like. They are generally added to the emulsion polymers at a level of 0.5 to 5% (dry weight), preferably 1.0 to 1.5%

In addition, certain copolymerizable monomers which assist in the stability of the emulsion polymer, e.g., vinyl sulfonic acid and 2-acrylamido-2-methyl propane sulfonic acid may be employed as latex stabilizers.

Conventional batch, semi-batch or continuous emulsion polymerization techniques may be utilized to prepare emulsion polymers. Generally, the monomers are polymerized in an aqueous medium under pressures not exceeding 100 atmospheres in the presence of a catalyst or initiator.

Suitable as polymerization catalysts or initiators are the water-soluble free-radical-formers generally used in emulsion polymerization, such as hydrogen peroxide, sodium persulfate, potassium persulfate and ammonium persulfate, as well as tert-butyl hydroperoxide, in amounts of between 0.01 and 3% by weight, preferably 0.01 and 1% by weight based on the total amount of the emulsion. They can be used alone or together with reducing agents such as sodium formaldehyde-sulfoxylate, ferrous salts, sodium dithionite, sodium hydrogen sulfite, sodium sulfite, sodium thiosulfate, as redox catalysts in amounts of 0.01 to 3% by weight, preferably 0.01 to 1% by weight, based on the total amount of the emulsion. Such free-radical-formers can be charged in the aqueous emulsifier solution or be added during the polymerization in doses.

Emulsion polymerization is generally carried out at a pH of between 2 and 7, preferably between 3 and 5. In order to maintain the pH range, it may be useful to work in the presence of customary buffer systems, for example, in the presence of alkali metal acetates, alkali metal carbonates or alkali metal phosphates. Polymerization regulators, like mercaptans, aldehydes, chloroform, ethylene chloride and trichloroethylene, can also be added in some cases.

Emulsifying agents that may be employed include those generally used in emulsion polymerization, as well as optionally present-protective colloids. Preferred protective colloids, but not limited to, are alkali soluble or dispersible resins as described in U.S. Pat. No. 4,529,787. It is also possible to use emulsifiers alone or in mixture with protective colloids.

The emulsifiers can be anionic, cationic, nonionic surface-active compounds or mixtures thereof. Suitable anionic emulsifiers are, for example, alkyl sulfonates, alkylaryl sulfonates, alkyl sulfates, sulfates of hydroxyalkanols, alkyl and alkylaryl disulfonates, sulfonated fatty acids, sulfates and phosphates of polyethyoxylated alkanols and alkylphenols, as well as esters of sulfosuccinic acid. Suitable cationic emulsifiers are, for example, alkyl quaternary ammonium salts, and alkyl quaternary phosphonium salts. Examples of suitable non-ionic emulsifiers are the addition products of 5 to 50 mols of ethylene oxide adducted to straight-chained and branch-chained alkanols with 6 to 22 carbon atoms, or alkylphenols, or higher fatty acids, or higher fatty acid amides, or primary and secondary higher alkyl amines; as well as block copolymers of propylene oxide with ethylene oxide and mixtures thereof. When combinations of emulsifying agents are used, it is advantageous to use a relatively hydrophobic emulsifying agent in combination with a relatively hydrophilic agent. The amount of emulsifying agent is generally from about 1 to about 10, preferably about 2 to about 8, weight percent of the monomers used in the polymerization.

The emulsifier used in the polymerization can also be added, in its entirety, to the initial charge to the polymerization zone or a portion of the emulsifier, e.g., from 90 to 25 percent thereof, can be added continuously or intermittently during polymerization.

Besides the blended polycarboxypolyamide/alkali dispersible resin polymer aqueous dispersion of this invention and an emulsion polymer component, a floor finish composition may also include a wax or wax dispersion, at least one coalescing aid, an ionic crosslinker and water.

Coalescing aids employed in this invention are generally organic solvents. The preferred coalescing aids used in the floor.finish compositions of this invention are glycol ether solvents based on ethylene or propylene glycol. Exemplary glycol coalescing aids include diethylene glycol ethyl ether, diproplyene glycol methyl ether, diethylene glycol propyl ether, dipropylene glycol-n-butyl ether, dipropylene glycol dibenzoate, diethylene glycol dibenzoate, propylene glycol dibenzoate, polypropylene glycol dibenzoate and polyethylene glycol dibenzoate. Other exemplary coalescing aids include dibutyl phthalate, diethyl phthalate, butylbenzyl phthalate, N-methyl-2-pyrrolidone, isodecyl benzoate, tributoxy ethyl phosphate and dibutoxy ethoxy ethyl adipate.

The type and amount of coalescing aid(s) used in the floor finish compositions of this invention can readily be determined by one of ordinary skill in the floor finish art. Typically, the type and amount of coalescing aids will be dependent upon the Tg of the styrene/acrylic or acrylic emulsion polymer. For example, higher Tg polymers generally require higher levels of coalescing aids than lower Tg polymers to produce well coalesced films. Therefore, the amount of coalescing aids can be minimized by reducing the Tg of the styrene/acrylic or acrylic emulsion polymer or by blending polymers having different glass transitions temperatures to provide a more environmentally favorable composition. However, the reduction in Tg must be balanced against the poorer scuff and black heel mark resistance found in lower Tg styrene/acrylic or acrylic emulsion polymers. The floor finish compositions of this invention having a polycarboxypolyamide component have been found to have excellent resistance properties.

The waxes or mixtures of waxes which may be used include waxes of a vegetable, animal, synthetic, and/or mineral origin, or mixtures thereof, such as carnauba, candelilla, Fischer-Tropsch wax, microcrystalline wax, lanolin, cocoa butter, cottonseed, stearin, Japan wax, bayberry, myrtle, mace, palm kernel, beeswax spermaceti, Chinese insect, mutton tallow, polyethylene (oxidized or not and including emulsions), polypropylene, copolymers of ethylene and acrylic esters, waxes obtained by the hydrogenation of coconut oil or soybean oils, and the mineral waxes such as paraffin, ceresin, montan, ozokerite and the like. Care should be taken in selecting the wax if water clarity is desired.

Wax-soluble or dispersible resins or gums may be substituted for up to 50% of the wax, by weight. Natural or synthetic materials, including terpene-phenolic resins, heat processed (run) Congo, wood rosin, oxidized petroleum wax and the like, are also suitable. Preferred water soluble or dispersible resins are styrene/acrylic resins as described in U.S. Pat. No. 4,529,787. These materials enhance the gloss and leveling characteristics of floor finish compositions.

The compositions are adapted to form clear glossy coatings. However, if desired, a colored appearance may be obtained by the introduction of water-soluble or oil-soluble dyes in suitable proportions. Examples of suitable dyes which may be used include iron blues, phthalocyanine blues and greens, and organic maroons. The amount of dye may be varied widely, depending on the effect desired.

The floor finish compositions of this invention may also include plasticizers, wetting aids, defoamers and antifoams, leveling aids and ionic crosslinking agents, if desired.

Examples of plasticizers that are suitable at low levels include benzylbutyl phthalate, dibutyl phthalate, dimethyl phthalate, triphenyl phosphate, 2-ethylhexylbenzyl phthalate, butylcyclohexyl phthalate, mixed benzoic acid and fatty oil acid esters of pentaerythritol, poly(propylene adipate) dibenzoate, diethyleneglycol dibenzoate, caprolactam, tetrabutylthiodisuccinate, butylphthalybutyl glycolate, acetyltributyl citrate, dibenzyl sebacate, tricresyl phosphate, ethyl toluenesulfonamide, the di-2-ethylhexyl ester of hexamethyleneglycol diphthalate, di(methylcyclohexyl)phthalate, tributoxyethyl phosphate and tributyl phosphate. The particular plasticizer and the amount thereof which may be employed is chosen in accordance with the demand for compatibility and efficiency in insuring optimum performance and finish clarity.

Examples of wetting and emulsifying agents which may be added in formulating the floor finish of this invention include alkali metal and amine salts of higher fatty acids having 12 to 18 carbon atoms, such as sodium, potassium, ammonium or morpholine oleate or ricinoleate, as well as the common nonionic surface active agents. Certain fluorocarbon surfactants, which are well known to those skilled in the art, also may be employed as wetting agents. The wetting agents may improve the spreading action of the floor finish.

The nonionic wetting and emulsifying agents include those prepared by the addition of ethylene oxide to compounds containing one or more active hydrogen atoms, such as alkyl phenols, fatty alcohols, fatty acids, fatty mercaptans, fatty amines, fatty amides and polyols. In many cases, the fatty radical is replaced by other types of hydrocarbon radicals in these starting materials. The polyols are often block polymers or copolymers of propylene oxide and/or butylene oxide, so the entire nonionic surface active agent in these cases may be regarded as a block polymer of ethylene oxide attached to the more hydrophobic block polymer or copolymer. More than one block of either type may be present.

Certain plasticizers, such as tributoxyethyl phosphate, may also serve as leveling aids if desired. Other leveling aids are well known to those skilled in the art.

If desired, an ionic crosslinking agent may be employed in the floor finish compositions of this invention. This ionic crosslinking agent may be a polyvalent metal complex containing a polyvalent metal moiety, an organic ligand moiety and, if the crosslinker is added as a chelate to the formulation in solubilized form, an alkaline moiety. The polyvalent metal ion may be that of beryllium, cadmium, copper, calcium, magnesium, zinc, zirconium, barium, aluminum, bismuth, antimony, lead, cobalt, iron, nickel or any other polyvalent metal which can be added to the composition by means of an oxide, hydroxide, or basic, acidic or neutral salt which has an appreciable solubility in water such as at least about 1% by weight therein. The alkaline moiety may be provided by ammonia or an amine. The organic ligand may be ammonia or an amine or an organic bidentate amino acid. The amino acid bidentate ligand may be an aliphatic amino acid, but may also be a hetrocylic amino acid.

Defoamers and antifoams are commonly used in the practice of floor finish formulating to reduce or eliminate foam marks in the dried finish film. As the formulating art is currently practiced, these are typically fatty acids or silicone polymer emulsions. Silicone emulsions are preferred for their greater efficiency and long-term activity.

Other formulation ingredients, such as perfumes or odor masking agents, dyes or colorants, bacterocides or bacteriostats may be included in the floor finish compositions of this invention, if desired.

This invention will be better understood from the Experimental Details which follow. However, one skilled in the art will readily appreciate that the specific methods and results discussed are merely illustrative of the invention and no limitation of the invention is implied.

Experimental Details

In the various examples which follow, the molecular weight of each polymer was determined via gel permeation chromatography ("GPC") techniques, using tetrahydrofuran ("THF") as eluent and poly(styrene) standards. The poly (styrene) standards thus utilized, which are presently available from Polymer Laboratories, Limited, of Church Stretton, Great Britain, are more particularly characterized as having number-average molecular weights of 2,250,000; 1,030,000; 570,000; 156,000; 66,000; 28,500; 9,200; 3,250; and 1,250.

Preparation of Polycarboxypolyamide Resins

Polycarboxypolyamide 1 (PCPA 1)

Empol™ 1016(200 parts), a diacid product of Henkel Corporation, Emery Group of Cincinnati, Ohio, a drop of phosphoric acid, and one drop of DC 200™ silicone fluid (1,000 centistokes; 0.001 square meters per second), manufactured by Dow Corning Corporation of Midland, Mich., were charged to a 4-neck round bottom flask. The flask was equipped with an overhead stirrer, a thermometer, a nitrogen inlet and a distillation apparatus. The distillation apparatus consisted of a steam jacketed packed column (glass beads), a Dean-Stark trap, and a condenser. The contents of the flask were heated to 110° C. under a nitrogen flow of 0.2 L/min. 2-Methyl-1,5-pentanediamine (31.73 parts), sold as DYTEK™ A by E.I. du Pont de Nemours and Company of Wilmington, Del., was added slowly. The temperature was raised gradually over the period of 2 hours to 200° C. which was maintained for two hours, while the water was removed by condensation in a Dean-Stark trap. The final remnants of water were removed under a light vacuum of 21 inches (533 mm) of Hg at 200° C. for 1 hour. The final polymer was a yellow, water insoluble rubbery material with an acid number of about 40 and a Tg of about −10° C. The number (Mn), weight (Mw) and z average molecular weight (Mz) were determined to be 4,200, 13,200, and 30,000, respectively.

Polycarboxypolyamide 2 (PCPA2)

100 parts of Empol™ 1016, 29.95 parts of adipic acid, a drop of phosphoric acid, and a drop of DC 200™ silicone fluid were charged to a 4-neck round bottom flask. The flask was equipped with an overhead stirrer, a thermometer, a nitrogen inlet and a distillation apparatus. The distillation apparatus consisted of a steam jacketed packed column (glass beads), a Dean-Stark trap, and a condenser. The contents of the flask were heated to 155° C. under a 0.2 L/min. stream of dry nitrogen. Isophorone diamine (48.79 parts) was added dropwise to the hot acid solution. Evolution of water began before the end of the addition. At the end of the addition, the temperature was raised to 170° C. where it was held for 20 minutes. At the end of this time, the temperature was raised 10° C. and held for an additional 20 minutes. This stepwise temperature ramp was continued until 200° C. was attained and maintained for two hours. During this time, the water of reaction was removed. The final remnants of water were removed under a light vacuum of 21 inches (533 mm) of Hg at 200° C. for 1 hour. The molten resin was discharged from the flask onto an aluminum foil sheet. This resin was water insoluble and had an acid number around 60 with a glass transition temperature (midpoint) of 42° C. Characteristic molecular weights of this resin were 2,500 (Mn), 4,500 (Mw), and 7,000 (Mz).

Polycarboxynolyamide 3 (PCPA3)

This polycarboxypolyamide was prepared in the same manner as Polycarboxypolyamide 2. The reaction mixture contained Empol™ 1016 (86.38 parts), Empo™ 1040 (367.68 parts), a polybasic fatty acid from Henkel Corporation, Emery Group of Cincinnati, Ohio, adipic acid (140.25 parts) and isophorone diamine (206.01 parts). This resin had an acid number around 80 with a glass transition temperature (midpoint) of 46° C. Characteristic molecular weights of this resin were 2,800 (Mn), 6,400 (Mw), and 11,000 (Mz).

Polycarboxyolyamide 4 (PCPA 4)

This polycarboxypolyamide was prepared in the same manner as Polycarboxypolyamide,2. The reaction mixture contained Empol™ 1016 (200 parts), adipic acid (59.9 parts) and isophorone diamine (108.08 parts). This water insoluble resin had an acid number around 41 with a glass transition temperature (midpoint) of 56° C. Characteristic molecular weights of this resin were 3,300 (Mn), 6,300 (Mw), and 9,500 (Mz).

Polycarboxypolyamide 5 (PCPA 5)

This polycarboxypolyamide was prepared by the method described in U.S. Pat. No. 4,810,747, the disclosure of which is incorporated by reference herein. The reaction mixture contained Empol™ 1016 (100 parts), Westvaco™ 1550 (41.91 parts; a difunctional fatty acid product manufactured by Westvaco Chemicals division of Charleston, S.C.), isophthalic acid (62.63 parts), adipic acid (5.04 parts), xylylenediamine (14.74 parts), isophorone diamine (73.70 parts) and xylene (25 parts). This water insoluble resin had an acid number around 58 with a glass transition temperature (midpoint) of 84° C. Characteristic molecular weights of this resin were 2,400 (Mn), 5,100 (Mw), and 10,300 (Mz).

Polycarboxpolyamide 6 (Comparative)

The polycarboxypolyamide was prepared in the same manner as Polycarboxypolyamide 1. The reaction mixture contained Empol™ 1016 (200 parts), propionic acid (14.4 parts), and DYTEK A™ (51.5 parts). This water insoluble resin had an acid number around 2 with a glass transition temperature (midpoint) of about −10° C. Characteristic molecular weights of this resin were 3,500 (Mn), 10,700 (Mw), and 22,000 (Mz).

Several additional polycarboxypolyamide resins were prepared in a manner similar to that previously described.

Polycarboxypolyamide 7 (PCPA 7) 59%
SylvadymTm T-18 (a polymerized fatty acid) available from Arizona Chemical, Panama City, Fla. 23% Dytekm A (2-methyl-1,5-pentane diamine)

18% Adipic Acid

This water insoluble polycarboxypolyamide had an acid number of about 41.0, a Tg (midpoint) of 10° C. and a Mw (theoretical) of about 8000.

Polycarboxypolyamide 8 (PCPA 8)

54% Empol™ 1016 (a polymerized fatty acid)
29.5% IPDA (Isophorone Diamine)
16.5% Adipic Acid This water insoluble polycarboxypolyamide had an acid number of 42, a Tg (midpoint) of 52° C. and a Mw (gel permeation chromatography) of about 5900.

Polycarboxypolyamide 9 (PCPA 9)

84% Empol™ 1018 (a polymerized fatty acid)
14% IPDA (Isophorone Diamine)
2% EDA (Ethylene Diamine)

This water insoluble polycarboxypolyamide had an acid number of 44, a Tg (midpoint) of 3° C. and a Mw (gel permeation chromatography) of about 10,500.

Polycarboxypolyamide 10 (PCPA 10)

81% Empolwm 1018 (a polymerized fatty acid)
19% IPDA (Isophorone Diamine)

This water insoluble polycarboxypolyamide had an acid number of 41, a Tg (midpoint) of 18° C. and a Mw (gel permeation chromatography of about 11,700.

Preparation of Alkali Dispersible Resins

Resin A

Pentalyn™ 261 was the trade name of a dibasic acid-modified rosin ester from Hercules Incorporated of Wilmington, Del. This resin had a reported acid number between 190 and 210. The resin had a glass transition temperature (Tg) of 115° C. The number, weight and z average molecular weights were determined to be 780, 3,000, and 10,000 respectively. The molecular weight distribution was dimodal.

Resin B

A resin comprised of about 37 percent alpha-methyl styrene, 32 percent styrene, and 31 percent acrylic acid was prepared by methods described in U.S. Pat. No. 4,529,787, the disclosure of which is incorporated by reference herein. This resin had an acid number of about 205 and a Tg of about 115° C. The number, weight and z average molecular weights were determined to be 3,100, 8,400 and 15,000, respectively.

Resin C

A resin comprised of about 38 percent alpha-methyl styrene, 37 percent styrene, and 25 percent acrylic acid was prepared by methods described in U.S. Pat. No. 4,529,787. This resin had an acid number of about 155 and a Tg of about 112° C. The number, weight and z average molecular weights were determined to be 3,200, 9,200 and 17,100 respectively.

Resin D

A resin comprised of about 50 percent butyl methylacrylate, 25 percent styrene, and 25 percent acrylic acid was prepared by methods described in U.S. Pat. No. 4,529,787. This resin had an acid number of about 185 and a Tg of about 65° C. The number, weight and z average molecular weights were determined to 3,400, 9,000 and 16,700, respectively.

Resin E

A resin comprised of about 34% alpha-methyl styrene, 33% acrylic acid and 33% styrene (by weight) was prepared by methods described in U.S. Pat. No. 4,529,787. This resin had an acid number of about 217 and a Tg of about 95° C. The weight average molecular weight was about 5500.

Preparation of Dispersions

EXAMPLE 1

Polycarboxypolyamide 1 (80 parts) and resin A (20 parts) were charged to a 4-neck round bottom flask equipped with an overhead stirrer, a thermometer and a condenser. This mixture was heated to 190° C. under nitrogen inert gas atmosphere and the resulting polymer melt was stirred vigorously for 15 minutes. This clear polymer blend had an acid number of 78 with a glass transition temperature (midpoint) of about 4° C. Characteristic molecular weights of this blend.were 1,900 (Mn), 8,600 (Mw), and 20,000 (Mz).

This blend (74.66 parts), Tergitol™ 15-S-20 surfactant (2.99 parts), stearic acid (0.19 parts), deionized water (175.0 parts), and 28% aqueous ammonia (6.7 parts) were charged to a 500 mL round bottom flask equipped with a stirrer, a thermometer, and a condenser. Tergitol™ 15-S-20 is the trade name for a branched alkyl ethoxylate surfactant manufactured by Union Carbide of Danbury, Conn. The blend was dispersed at 85° C. for 1 hour. The resultant dispersion at 30 percent solids was a translucent yellow fluid with a pH of 9.2 and a viscosity of 138 centipoise (cps) (0.138 pascal.seconds) at 25° C. The dispersion was stable after 4 weeks storage in an oven at 50° C.

EXAMPLE 2

Polycarboxypolyamide 1 (59.73 parts), Resin A (14.93 parts), Tergitol™ 15-S-20 (2.99-parts), stearic acid (0.19 parts), deionized water (174.0 parts), and 28% aqueous ammonia (6.7 parts) were charged to a 500 mL round bottom flask equipped with a stirrer, a thermometer, and a condenser. This mixture was dispersed at 85° C. for 1 hour. The resultant dispersion at 30 percent solids was a translucent yellow fluid with a pH of 9.2 and a viscosity of 156 cps (0.156 pascal.seconds) at 25° C.

EXAMPLE 3

Polycarboxypolyamide 2 (80 parts) and Resin A (20 parts) were blended in the same manner as Example 1. This clear polymer blend had an acid number of 88 with a glass transition temperature (midpoint) of about 47° C. Characteristic molecular weights of this blend were 1,800 (Mn), 4,500 (Mw), and 8,200 (Mz).

This blend (100 parts), 28% aqueous ammonia (10.23 parts), and deionized water (209.83 parts) were dispersed in the manner described in Example 1, except the mixture was held at 85° C. for 2.5 hours. The resultant dispersion at 30 percent solids was a clear brown fluid with a pH of 9.4 and a viscosity of 39 cps (0.039 pascal.seconds) at 25° C.

EXAMPLE 4

Polycarboxypolyamide 1 (80 parts) and Resin A (20 parts) were charged to a 4-neck round bottom flask equipped with an overhead stirrer, a thermometer and a condenser. This mixture was heated to 190° C. under a nitrogen inert gas atmosphere and the resulting polymer melt was stirred vigorously for 15 minutes. This clear polymer blend had an acid number 80.

This blend (30.2 parts), Tergitol™ 15-S-12 (1.38 parts), sodium lauryl sulfate (0.15 parts), glycine (0.15 parts) deionized water (67.25 parts), and 28% aqueous ammonia (2.75 parts) were charged to a 500 mL round bottom flask equipped with a stirrer, a thermometer, and a condenser. The blend was dispersed at 85° C. for 1 hour. The resultant dispersion at 30 percent solids was a translucent yellow fluid with a pH of 9.6 and a viscosity of 265 cps (0.265 pascal.seconds) at 25° C.

EXAMPLE 5

Polycarboxypolyamide 2 (80 parts), Resin B (20 parts), and stearic acid (1 part) were blended in the same manner as Example 1. This clear polymer blend had an acid number of 86 with a glass transition temperature (midpoint) of about 49° C. Characteristic molecular weights of this blend were 2,800 (Mn), 6,000 (Mw), and 11,200 (Mz).

This blend (100 parts), 28% aqueous ammonia (9.76 parts), and deionized water (223.57 parts) were dispersed in the manner described in Example 3. The resultant dispersion at 30 percent solids was a clear yellow fluid with a pH of 9.4 and a viscosity of 35 cps (0.035 pascal.seconds) at 25° C. This sample was stable after 4 weeks storage in an oven at 50° C.

EXAMPLE 6

Polycarboxypolyamide 2 (50 parts), Resin B (50 parts), and stearic acid (1 part) were blended in the same manner as Example 1. This opaque polymer blend had an acid number of 131 with a glass transition temperature (midpoint) of about 64° C. Characteristic molecular weights of this blend were 2,700 (Mn), 7,400 (Mw), and 16,800 (Mz).

This blend (100 parts), 28% aqueous ammonia (14.89 parts), and deionized water (218.44 parts) were dispersed in the manner described in Example 3. The resultant dispersion at 30 percent solids was a clear yellow fluid with a pH of 9.4 and a viscosity of 37 cps (0.037 pascal.seconds) at 25° C.

EXAMPLE 7

Polycarboxypolyamide 3 (50 parts), Resin B (50 parts), and stearic acid (1 part) were blended in the same manner as Example 1. This opaque polymer blend had an acid number of 144 with a glass transition temperature (midpoint) of about 50° C. Characteristic molecular weights of this blend were 2,700 (Mn), 8,000 (Mw), and 16,000 (Mz).

This blend (100 parts), 28% aqueous ammonia (15.58 parts), and deionized water (217.75 parts) were dispersed in the manner described in Example 3. The resultant dispersion at 30 percent solids was a clear brown fluid with a pH of 9.2 and a viscosity of 37 cps (0.037 pascal.seconds) at 25° C.

EXAMPLE 8

Polycarboxypolyamide 4 (80 parts), Resin B (20 parts), and stearic acid (1 part) were blended in the same manner as 25 Example 1. This opaque polymer blend had an acid number of 74 with a glass transition temperature (midpoint) of about 56° C. Characteristic molecular weights of this blend were 3,100 (Mn), 7,900 (Mw), and 15,100 (Mz).

This blend (100 parts), 28% aqueous ammonia (8.35 parts), and deionized water (224.98 parts) were dispersed in the manner described in Example 3. The resultant dispersion at 30 percent solids was a hazy yellow fluid with a pH of 9.1 and a viscosity of 36 cps (0.036 pascal.seconds) at 25° C.

EXAMPLE 9

Polycarboxypolyamide 4 (50 parts) and Resin C (50 parts) were blended in the same manner as Example 1. This opaque polymer blend had an acid number of 99 with a glass transition temperature (midpoint) of about 65° C. Characteristic molecular weights of this blend were 2,800 (Mn), 7,200 (Mw), and 13,200 (Mz).

This blend (100 parts), 28% aqueous ammonia (11.2 parts), and deionized water (222.14 parts) were dispersed in the manner described in Example 3. The resultant dispersion at 30 percent solids was a clear yellow fluid with a pH of 9.1 and a viscosity of 66 cps (0.066 pascal.seconds) at 25° C.

EXAMPLE 10

Polycarboxypolyamide 2 (80 Parts) and resin D (20 parts) were blended in the same manner as Example 1. This clear polymer blend had an acid number of 85. Characteristic molecular weights of this blend were 2,800 (Mn), 6,300 (Mw), and 13,200 (Mz).

This blend (100 parts), 28% aqueous ammonia (9.66 parts), and deionized water (223.68 parts) were dispersed in the manner described in Example 3. The resultant dispersion at 30 percent solids was a clear yellow fluid with a pH of 9.3 and a viscosity of 76 cps (0.076 pascal.seconds) at 25° C.

EXAMPLE 11

Polycarboxypolyamide 2 (40 parts), Resin D (10 parts), deionized water (111.70 parts), and 28% aqueous ammonia (5.0 parts) were charged to a 600 mL pressure reactor manufactured by the Parr Instrument Company of Moline, Ill. This mixture was dispersed at 150° C. for 1 hour under a nitrogen inert gas atmosphere. The resultant dispersion at 30 percent solids was a clear yellow fluid with a pH of 9.1 and a viscosity of 40 cps (0.040 pascal.seconds) at 25° C.

EXAMPLE 12

Polycarboxypolyamide 5 (80 parts) and Resin D (20 parts) were blended in the same manner as Example 1. This opaque polymer blend had an acid number of 81. Characteristic molecular weights of this blend were 2,500 (Mn), 7,000 (Mw), and 16,700 (Mz).

This blend (86.5 parts), 28% aqueous ammonia (7.99 parts), and deionized water (214.4 parts) were dispersed in the manner described in Example 3. The resultant dispersion at 28 percent solids was a clear yellow fluid with a pH of 9.0 and a viscosity of 19 cps (0.019 pascal.seconds) at 25° C.

COMPARATIVE EXAMPLE 1

Polycarboxypolyamide 6 (80 parts) and Resin A (20 parts) were charged to a 4-neck round bottom flask equipped with an overhead stirrer, a thermometer and a condenser. This mixture was heated to 190° C. under a nitrogen inert gas atmosphere and the resulting polymer melt was stirred vigorously for 15 minutes. This clear polymer blend had an acid number of 44 with a glass transition temperature (midpoint) of about 10° C.

This blend (30.2 parts), Tergitol™ 15-S-12 (1.38 parts), sodium lauryl sulfate (0.15 parts), glycine (0.11 parts), deionized water (69.0 parts), and 28% aqueous ammonia (1.6 parts) were charged to a 500 mL round bottom flask equipped with a stirrer, a thermometer, and a condenser. The blend was dispersed at 85° C. for 2 hours. On cooling, the mixture separated into two layers.

COMPARATIVE EXAMPLE 2

Polycarboxypolyamide 1 (51.0 parts), deionized water (116.5 parts), and 28% aqueous ammonia (2.65 parts) were charged to a 500 mL round bottom flask equipped with a stirrer, a thermometer, and a condenser. The blend was dispersed at 85° C. for 1 hour. On cooling, the mixture was a white, gritty dispersion. The dispersion separated after a day at room temperature.

COMPARATIVE EXAMPLE 3

Polycarboxypolyamide 2 (50.0 parts), deionized water (113.53 parts), and 28% aqueous ammonia (3.14 parts) were charged to a 500 mL round bottom flask equipped with a stirrer, a thermometer, and a condenser. The blend was dispersed at 85° C. for 3 hours. An additional 11.9 parts of deionized water was added to reduce the viscosity. On cooling, the mixture was a thick, cloudy, brown dispersion. Some of the resin was not dispersed. The dispersion (at 28 percent solids) had a pH of 9.2 and viscosity of 2,000 cps (2.00 pascal.seconds) at 25° C. The 20 dispersion began to separate after five days at room temperature.

COMPARATIVE EXAMPLE 4

Polycarboxypolyamide 3 (50.0 parts), deionized water (112.09 parts), and 28% aqueous ammonia (4.57 parts) were charged to a 500 mL round bottom flask equipped with a stirrer, a thermometer, and a condenser. The blend was dispersed at 85° C. for 3 hours. An additional 83.3 parts of deionized water was added to reduce the viscosity. On cooling, the mixture was a cloudy, brown dispersion. Some of the resin was not dispersed. The dispersion (at 20 percent solids) had a pH of 9.3 and a viscosity of 63 cps (0.063 pascal.seconds) at 25° C. The dispersion began to separate after five days at room temperature.

COMPARATIVE EXAMPLE 5

Polycarboxypolyamide 5 (50.0 parts), deionized water (113.3 parts), and 28% aqueous ammonia (3.3 parts) were charged to a 500 mL round bottom flask equipped with a stirrer, a thermometer, and a condenser. The blend was dispersed at 85° C. for 3 hours. An additional 166.6 parts of deionized water was added to reduce the viscosity. On cooling, the mixture was a cloudy, white dispersion. About 25 percent of the resin was not dispersed. The dispersion (at 12.7 percent solids) had a pH of 9.5 and a viscosity of 42 cps (0.042 pascal.seconds) at 25° C.

EXAMPLE 13

The dispersion of Example 7 was used as a dispersing agent for titanium dioxide pigment. The dispersion was prepared with 175 parts of the dispersion from Example 7 and 300 parts of OR-580. OR-580 was the trade name of a titanium dioxide pigment manufactured by Kemira of Helsinki, Finland. The components were mixed with a high speed mixer, a Dispersator™ manufactured by Premier Mill Corporation of Temple, Pa., for 40 minutes at 5,000 rpm.

A white ink was prepared from this dispersion (55 parts), Jonwax™ 120 (5.0 parts)—a polyethylene and paraffin wax emulsion manufactured by S.C. Johnson & Son, Inc. of Racine, Wisconsin, and SCX™-2640 (40 parts)—a film-forming styrene/acrylic emulsion polymer from S.C. Johnson & Son, Inc. of Racine, Wis. Water was added to reduce the viscosity to 25 seconds as measured with a #2 Zahn cup at 25° C. The experimental ink was printed on high slip low density polyethylene from Huntsman Corporation of Houston, Tex. using a 200P handproofer. The experimental ink demonstrated a 60° gloss of 52 with good film wetting. A standard ink was prepared in the same manner using a commercial pigment dispersion, Flexiverse™ WFD-5006 from Sun Chemical Corporation of Fort Lee, N.J. This ink had a 60° gloss of 47 with good film wetting.

EXAMPLE 14

Preparation Of Paper Sizing Agents

Paper sizing agent solutions were prepared using the dispersions from Examples 5 and 6. A typical sizing solution containing 8 percent starch and 0.2 percent of a polycarboxypolyamide/acrylic dispersion from either Example 5 or 6. Paper samples were immersed and roller coated with each of the sizing solutions which had been maintained at 65° C. prior to coating. The coated papers were sandwiched between two blotting papers and dried in a drum dryer for 5 minutes at 115° C. The coated paper were allowed to dry for 1 day.

The penetration of an aqueous solution containing 1.25 percent naphthol green B dye and 1 percent formic acid through the treated papers were measured with a Hercules Sizing Tester, manufactured by Hercules Incorporated of Wilmington, Del. The time required for the reflectance of each sheet surface to drop to a predetermined percentage (80%) of its original reflectance was measured in seconds. Reflectance drops for sizing solutions containing dispersions from Examples 5 and 6 required 146 and 145 seconds, respectively. The reflectance drop for uncoated paper required about 20 seconds.

EXAMPLE 15

Preparation Of A Thermoset Coating

The dispersion of Example 7 was used as a component of an aqueous thermoset coating. The dispersion of Example 7 (50.0 parts) was combined with a solution of Cymel™ 303 (7.52 parts), a 20% aqueous solution of p-toluenesulfonic acid (0.45 parts), and concentrated aqueous ammonia (0.2 parts). Cymel™ 303 is a melamine product manufactured by Cytec of West Paterson, N.J. The solution of Cymel™ 303 was prepared by mixing 7.0 parts of the Cymel™ 303 with 7.0 parts of water and 3.5 parts of methanol.

This coating solution was drawn down on a cold-rolled steel panel with a #40 wire wound rod. The coating was baked in an oven at 150° C. for 30 minutes. This continuous thermoset coating had excellent chemical resistance, passing 150 double rubs with methyl ethyl ketone. The rub testing was performed with a A.A.T.C.C. Crockmeter™ from Atlas Electric Devices Company of Chicago, Ill.

EXAMPLE 16

Preparation Of An Emulsion Polymer

An emulsion polymer was prepared for use as a component of a floor finish. The emulsion polymerization method followed the method described in U.S. Pat. No. 4,820,762, the disclosure of which is incorporated by reference herein.

A 2,000 mL 4 neck round bottom flask was equipped with an overhead stirrer, a condenser, and a thermometer. To this flask was charged Rhodacal™ DS-10 (5.8 parts), Tergitol™

15-S-12 (2.9 parts)., and deionized water (360.0 parts). Rhodacal™ DS-10 is an anionic surfactant manufactured by Rhone Poulenc of Cranberry, N.J. Tergitol™ 15-S-12 is a non-ionic surfactant manufactured by Union Carbide of Danbury, Conn. This mixture was heated to 80° C. under a light flow of nitrogen gas.

A first stage monomer mixture of 68.0 parts of styrene, 73.5 parts of butyl acrylate, 14.0 parts alpha-methyl styrene, 28.0 parts methyl methacrylate, 42.5 parts methacrylic acid, and 0.6 parts of mercaptoacetic acid was prepared. A second monomer mixture was prepared from 17.0 parts of styrene, 14.0 parts of butyl acrylate, 8.5 parts of alpha-methyl styrene, and 17.5 parts of methyl methacrylate.

An initiator solution was prepared by dissolving ammonium persulfate (2.0 parts) in deionized water (20.0 parts). A second initiator solution was prepared by dissolving 0.6 parts of ammonium persulfate in 8.5 parts of deionized water.

A resin mixture was prepared from the dispersion of Example 3 (191.7 parts), 28% aqueous ammonia (13.5 parts), and deionized water (81.4 parts).

The first initiator solution was added to the contents of the flask. After two minutes, the first stage monomer mixture was started and metered in over 50 minutes. At the end of this feed, the reaction mixture was held for 25 minutes. After this hold, the resin mixture was added over a 15 minute period. Deionized water (20 parts) was used to rinse the addition funnel after the resin mixture was added.

Ten minutes later, the second initiator solution was added, followed by a 2 minute hold. The second stage monomer mixture was added over 15 minutes. The monomer addition funnel was rinsed with an additional 10 parts of deionized water after the end of the monomer feed. The reaction was held for 90 minutes at 80° C. before the latex was cooled and filtered.

This polymer was used as a component of a floor finish formulation. The floor finish formula gave a coating with excellent gloss, improved gloss retention, and good durability.

EXAMPLE 17

Preparation Of An Emulsion Polymer

An emulsion polymer was prepared for use as an overprint varnish. A 500 mL 4 neck round bottom flask was equipped with an overhead stirrer, a condenser, and a thermometer. To this flask was charged the dispersion of Example 5 (180.6 parts), Rhodacal™ DS-10 (0.64 parts), Pluronic™ P123 (1.56 parts), deionized water (34.52 parts) and 28% aqueous ammonia (0.75 parts). Pluronic™ P123 is a nonionic surfactant manufactured by BASF Corporation of Parsippany, N.J. This mixture was heated to 87° C. under a light flow of nitrogen gas.

A mixture of 47.6 parts of styrene and 30.43 parts of 2-ethylhexyl acrylate was prepared. A portion of this mixture (7.8 parts) was removed as a monomer precharge. An initiator solution was prepared by dissolving ammonium persulfate (0.78 parts) in deionized water (3.12 parts).

The monomer precharge was added to the hot contents of the flask. After 5 minutes, the initiator solution was added. After an additional 5 minutes, the mixture of the remaining monomers was added. This addition was completed in 60 minutes. The emulsion polymer was held for an additional 30 minutes after the end of the feed.

The final latex was cooled and filtered. The latex had a pH of 8.9 and a viscosity of 286 cps (0.286 pascal.seconds) at 25° C. The number average particle size was 47 nm and the weight average particle size was 49 nm. The residual monomer level was low.

The latex was evaluated as the sole component of an overprint varnish which exhibited excellent gloss, water resistance and sodium hydroxide solution resistance. The coating exhibited a high slide angle and good rub resistance.

EXAMPLE 18

Preparation Of An Emulsion Polymer

Another latex was prepared for an overprint varnish. A 1000 mL, 4 neck round bottom flask was equipped with an overhead stirrer, a condenser, and a thermometer. To this flask was charged the dispersion of Example 6 (228.81 parts), Rhodacal™ DS-10 (1.23 parts), and deionized water (100.06 parts). This mixture was heated to 80° C. under a light flow of nitrogen gas.

A mixture of 90.69 parts of styrene and 60.46 parts of 2-ethylhexyl acrylate was prepared. A portion of this mixture (15.1 parts) was removed as a monomer precharge. An initiator solution was prepared by dissolving ammonium persulfate (1.51 parts) in deionized water (13.6 parts).

The monomer precharge was added to the hot contents of the flask. After 5 minutes, the initiator solution was added. After an additional 20 minutes, the mixture of the remaining monomers was added. This addition was completed in 90 minutes. The emulsion polymer was held for an additional 60 minutes at 85° C. after the end of the feed.

The final latex was cooled and filtered. The latex had a pH of 9.1 and a viscosity of 179 cps (0.179 pascal.seconds) at 25° C. The number average particle size was 44 nm and the weight average particle size was 49 nm. The residual monomer level was low. The latex was evaluated as the sole component of an overprint varnish which exhibited excellent gloss and water resistance. The coating exhibited a high slide angle and good rub resistance.

EXAMPLE 19

Preparation Of An Emulsion Polymer

A latex was prepared for use as a component of an ink for high slip low density polyethylene. A 500 mL 4 neck round bottom flask was equipped with an overhead stirrer, a condenser, and a thermometer. To this flask was charged the dispersion of Example 5 (182.18 parts), PLURONIC™ P123 (1.57 parts), deionized water (30.00 parts) and 28% aqueous ammonia (0.5 parts). This mixture was heated to 75° C. under a light flow of nitrogen gas.

A mixture of 15.73 parts of methyl methacrylate, 23.59 parts of 2-ethylhexyl acrylate, and 39.32 parts of butyl acrylate was prepared. A portion of this mixture (7.8 parts) was removed as a monomer precharge. An initiator solution was prepared by dissolving ammonium persulfate (0.79 parts) in deionized water (6.38 parts).

The monomer precharge was added to the hot contents of the flask. After 5 minutes, the initiator solution was added. After an additional 10 minutes, the mixture of the remaining monomers was added. This addition was completed in 120 minutes. The emulsion polymer was held for an additional 60 minutes after the end of the feed at 85° C.

The final latex was cooled and filtered. The latex had a pH of 8.9 and a viscosity of 145 cps (0.145 pascal.seconds) at 25° C. The number average particle size was 40 nm and the weight average particle size was 52 nm. The residual monomer level was low.

A white ink was prepared from this latex (35 parts), water (5.5 parts) and Flexiverse™ WFD-5006 (60.3 parts), a pigment dispersion manufactured by Sun Chemical Corporation. This ink had a viscosity of 26 seconds in a #2 Zahn cup at 25° C. A standard ink was prepared from Joncryl™ 624 (35 parts), water (4.0 parts), and Flexiverse WFD-5006 (60.3 parts). Joncryl™ 624 is a latex polymer designed for the film printing market and sold by S.C. Johnson & Son, Inc. of Racine, Wis. This standard ink had a viscosity of 27 seconds-in a #2 Zahn cup at 25° C. The experimental and standard inks were printed side-by-side on high slip low density polyethylene from Huntsman Corporation using a 180P handproofer. The experimental ink demonstrated gloss equal to the standard with better early water resistance, early tape adhesion, substrate wetting, and resolubility.

EXAMPLE 20

Preparation Of An Emulsion Polymer

Another emulsion polymer was prepared as a component of an ink for high slip low density polyethylene. A 1000 mL, 4 neck round bottom flask was equipped with an overhead stirrer, a condenser, and a thermometer. To this flask was charged the dispersion of Example 6 (190.68 parts), and deionized water (125.38 parts). This mixture was heated to 80° C. under a light flow of nitrogen gas.

A mixture of 14.75 parts of styrene, 58.98 parts of 2-ethylhexyl acrylate, 72.25 parts of butyl acrylate, 1.47 parts of divinyl benzene, and 2.95 parts of Pluronic™ P123 was prepared. A monomer precharge of 16.38 parts of styrene and 0.33 parts of Pluronic™ P123 was prepared. An initiator solution was prepared by dissolving ammonium persulfate (1.64 parts) in deionized water (14.75 parts).

The monomer precharge was added to the hot contents of the flask. After 5 minutes, the initiator solution was added. After an additional 45 minutes, the mixture of the monomer mixture was added. This addition was completed in 90 minutes. The emulsion polymer was held for an additional 60 minutes after the end of the feed at 85° C.

The final latex was cooled and filtered. The latex had a pH of 8.7 and a viscosity of 387 cps (0.387 pascal.seconds) at 25° C. The number average particle size was 53 nm and the weight average particle size was 71 nm. The residual monomer level was low.

A white ink was prepared from this latex (40 parts), Jonwax™ 120 (5.0 parts)—a polyethylene and paraffin wax emulsion manufactured by S.C. Johnson & Son, Inc. of Racine, Wis., and the pigment dispersion of Example 13 (55 parts). This ink had a viscosity of 25 seconds in a #2 Zahn cup at 25° C. The experimental ink was printed on high slip low density polyethylene from Huntsman Corporation using a 200P handproofer. The experimental ink demonstrated a 60E gloss of 59 with good film wetting. After 24 hours, the inks showed good tape adhesion and water resistance.

EXAMPLE 21

Preparation of Styrene/acrylic—Polycarboxy-Polyamide Containing Emulsion for Use in a Floor Finish Composition An emulsion polymer composed of a styrene/acrylic latex and a water borne dispersion of a polycarboxypolyamide and an alkali dispersible resin was prepared by the following method:

A 2 liter 4-neck round bottom flask equipped with a heating/cooling system means, variable rate anchor paddle agitation, and mechanical pumps as a means for metering monomers and water borne resin dispersions was employed.

First-stage Styrene/acrylic Emulsion Polymerization

To the 2 liter flask was charged 217 g deionized (DI) water, 3.4 g of Rhodacal™ DS-10 (Sodium Dodecyl Benzene Sulfonate; an anionic surfactant available from Rhone Poulenc, Cranberry, N.J.), and 1.7 g of Tergitol™ 15-S-12 (C11–C15 secondary alcohol exthoxylate with about 12 moles ethylene oxide; a nonionic surfactant available from Union Carbide, Danbury, Conn.). These contents were mixed by paddle agitation at 200 rpm and heated to 80° C. Next, 1.1 g of ammonium persulfate in log DI-water was added to the flask and the mixture was held at 80° C. for 2 minutes. An internal contents temperature of 80° C. was maintained throughout the entire reaction procedure by means of the heating/cooling system.

After the 2 minute hold period, the free-radical emulsion polymerization was initiated by feeding a homogeneous mixture of 70.7 g Styrene (STY), 38.1 g butyl acrylate (BA), 27.2 g methacrylic acid (MAA), and 0.6 g butylmercaptopropionate to the flask contents uniformly over a period of 50 minutes. When the monomer feed was completed, the contents were held at 80° C. for 25 minutes.

Polymaide Resin Dispersion Mid-add and Neutralization Step

After the 25 minute hold period, 115.5 g of a 30% w/w water-borne resin dispersion prepared in a manner similar to Example 5 consisting of an 80:20 dry weight ratio mixture of polycarboxypolyamide resin 2 and a alkali dispersible resin E in 70 g DI water and 8 g ammonium hydroxide (28% w/w solution in $H_2O$) was fed to the flask contents over a period of 10 minutes. When the resin a dispersion feed was completed, the contents were held at 80° C. for 10 minutes.

Second Stage Styrene/acrylic Emulsion Polymerization

After the 10 minute hold period, 0.3 g ammonium persulfate in 5 g DI water was added to the flask contents and the contents mixture was held at 80° C. for 2 minutes.

After the 2 minute hold period, the free-radical emulsion polymerization was continued by feeding a homogeneous mixture of 23.8 g styrene and 10.2 g methylmethacrylate over a period of 15 minutes. When the monomer feed was completed, the contents were held at 80° C. for 90 minutes. After the 90 minute hold period, the flask contents were cooled to 30° C. and discharged. The final emulsion polymer product had a styrene/acrylic composition of 56% styrene/22% butyl acrylate/16% methacrylic acid/6% methyl methacrylate (by weight) and a Tg=85° C. (Jordan). The dry weight ratio of styrene/acrylic latex polymer to polycarboxypolyamide/alkali dispersible resin dispersion was 83:17, respectively. The final emulsion polymer product had latex physicals of 35% non-volatiles (NV), pH=7.8, Brookfield Viscosity (BF)=15 cps (LVF 60 rpm/spindle #1), Particle Size=70 nm (BI-90 P.S. analyzer—Brookhaven Inst. Corp.), and % coagulum <0.01%.

EXAMPLE 21A

Prepatation of a Floor Finish Compostion

A floor finish composition composed of the styrene/acrylic—polycarboxypolyamide/alkali dispersible resin dispersion emulsion polymer prepared in example 21 was prepared as follows.

A 300 ml vessel equipped with an agitation means was charged with 24.3 g DI water, 4 g Carbitol, 1.5 g N-methyl-2-pyrrolidone (NMP), 0.5 g propylene glycol phenyl ether (PPH), 5.7 g Zonyl FSE (a 1/% w/w water solution of a fluorosurfactant wetting aid available from E.I. Dupont de Nemours & Company, Wilmington, Del.), and 0.8 g Fluorad FC-120 (of a 1% w/w water solution of a fluorosurfactant wetting aid available from 3M, St. Paul, Minn.). The vessel contents were mixed for 5 minutes at room temperature in order to ensure homogeneity. Agitation continued throughout the blending procedure.

After the 5 minute mix period, 37.9 g (of a 35% w/w water-borne emulsion) styrene/acrylic—polycarboxypolyamide/alkali dispersible resin emulsion polymer (as prepared in example #21) was added uniformly over 5 minutes then held for a period of 5 minutes with mixing.

After the 5 minute mix period, 5.7 g of AC-316 (a 35% w/w water borne dispersion of an oxidized polyethylene wax). was added uniformly over 2 minutes then held for a period of 5 minutes with mixing. Next, 2.5 g Zinc Ammonium Carbonate (as a 15% w/w water solution of ZnO) was added uniformly over a period of 5 minutes, then held for a period of 1 hour with mixing. The floor finish composition was then allowed to age for 1 day at room temperature before coating and film testing was carried out. The final floor finish composition had aqueous physicals of % NV=18.6%, pH=8.6, BF Viscosity=6.5 cps (LVF 60 rpm/spindle #1) and % coagulum<0.001%.

A number of alkali dispersible resins, some of which have been previously described herein, were employed in the floor finish compositions of this invention. Those resins and their properties are set forth in Table 1 below.

TABLE 1

| Resin | Components | Acid # | Tg ° C. (midpoint) | Mw (GPC) |
|---|---|---|---|---|
| E | 34% alpha-methyl styrene<br>33% acrylic acid<br>33% styrene | 217 | 95 | 5500 |
| D | 50% butyl methacrylate<br>25% styrene<br>25% acrylic acid | 185 | 65 | 9000 |
| A | Pentalyn 261, a dibasic acid modified rosin ester available from Hercules, Inc. Wilmington, Delaware | 190–210 | 115 | 3000 |
| B | 37% alpha-methyl styrene<br>32% styrene<br>31% acrylic acid | 205 | 115 | 8400 |

The methods used to prepare B, D and E are described in U.S. Pat. No. 4,529,787, the disclosure of which is incorporated by reference herein.

EXAMPLES 22–33

Several additional styrene/acrylic-polycarboxyamide/alkali dispersible resin emulsions were prepared in a manner similar to Example 21. The components of those emulsions are set forth in Table 2 below

TABLE 2

| | STYRENE/ACRYLIC COMPOSITION | | | | | | Polycarboxy polyamide | Alkali Disper. |
|---|---|---|---|---|---|---|---|---|
| Example | % STY | % BA | % MAA | % MMA | % AMS | Tg ° C. | Composition | Resin |
| 22 | 56 | 22 | 16 | 6 | — | 85 | PCPA 7 | D |
| 23 | 56 | 22 | 16 | 6 | — | 85 | PCPA 2 | E |
| 24 | 56 | 22 | 16 | 6 | — | 85 | PCPA 8 | D |
| 25 | 56 | 22 | 16 | 6 | — | 85 | PCPA 2 | D |
| 26 | 45 | 29 | 17 | 6 | 3 | 77 | PCPA 2 | A |
| 27 | 30 | 31 | 15 | 16 | 8 | 76 | PCPA 2 | B |
| 28 | 30 | 31 | 15 | 16 | 8 | 76 | PCPA 2 | D |
| 29 | 30 | 31 | 15 | 16 | 8 | 76 | PCPA 9 | A |
| 30 | 30 | 31 | 15 | 16 | 8 | 76 | PCPA 10 | A |
| 31 | 35 | 26 | 17 | 14 | 8 | 86 | PCPA 2 | A |
| 32 | 45 | 29 | 17 | 6 | 3 | 77 | PCPA 2 | A |
| 33 | 30 | 31 | 15 | 16 | 8 | 76 | PCPA 2 | A |

STY - styrene
BA - butyl acrylate
MMA - methylmethacrylate
MAA - methacrylic acid
AMS - alpha-methyl styrene The styrene/acrylic-polycarboxypolyamide/alkali dispersible resin emulsions described in Table 2 were emoployed to prepared floor finish compositions in substantially the same manner as described in Example 21A. The components of those floor finish compositions are set forth below in Table 3.

tance (D 3052). This modified test method yields both scuff and black heel mark resistance properties.

Floor finish coatings were prepared for test by building-up a 4 layer coating with finish on a white VCT tile (9"×9") with a cheesecloth applier (2.0 ml/sq.ft. wet coverage) one coat at a time with 40 minutes dry time between coatings. The final

TABLE 3

| Floor Comp. | Emul. Ex. | Emul. 35% NV (g) | Finish % NV (g) | C-71 (g) | B-33 (g) | CARB | DPM | DP | NMP | PPH | DPnB | KP-140 | P-226 | ZAC | AC316 | E-43 |
|---|---|---|---|---|---|---|---|---|---|---|---|---|---|---|---|---|
| F1 | 22 | 37.9 | 18.6 | — | — | 4 | — | — | 1.5 | 0.5 | — | — | — | 2.5 | 5.7 | — |
| F2 | 23 | 37.9 | 18.6 | — | — | 4 | — | — | 1.5 | 0.5 | — | — | — | 2.5 | 5.7 | — |
| F3 | 23 | 37.9 | 18.6 | — | — | 4.5 | 2.2 | — | — | — | — | — | — | 2.5 | 5.7 | — |
| F4 | 24 | 37.9 | 18.6 | — | — | 4 | — | — | 1.5 | 0.5 | — | — | — | 2.5 | 5.7 | — |
| F5 | 25 | 37.9 | 18.6 | — | — | 4 | — | — | 1.5 | 0.5 | — | — | — | 2.5 | 5.7 | — |
| F6 | 25* | 37.9 | 18.6 | — | — | 4 | — | — | 1.5 | 0.5 | — | — | — | 2.5 | 5.7 | — |
| F7 | 26 | 41.8 | 20.3 | — | 10.9 | 4.5 | — | — | — | — | 2.2 | 0.4 | 0.6 | 3.5 | 6.0 | — |
| F8 | 27 | 37.9 | 18.6 | — | — | 4 | — | 4 | — | — | — | — | — | 3.5 | 2.6 | 2.3 |
| F9 | 28 | 37.9 | 18.6 | — | — | 4 | — | 4 | — | — | — | — | — | 3.5 | 2.6 | 2.3 |
| F10 | 29 | 37.9 | 18.6 | — | — | 4 | — | 4 | — | — | — | — | — | 3.5 | 2.6 | 2.3 |
| F11 | 30 | 37.9 | 18.6 | — | — | 4 | — | 4 | — | — | — | — | — | 3.5 | 2.6 | 2.3 |
| F12 | 28 | 35.9 | 20.3 | 5.2 | 10.9 | 4.5 | 2.2 | — | — | — | — | 0.4 | — | 2.7 | 3.0 | 2.6 |
| F13 | 33 | 35.9 | 20.3 | 5.2 | 10.9 | 4.5 | 2.2 | — | — | — | — | 0.4 | — | 3.0 | 3.0 | 2.6 |
| F14 | 33 | 35.9 | 20.3 | 5.2 | 10.9 | 4.5 | 2.2 | — | — | — | — | 0.4 | — | 2.7 | 3.0 | 2.6 |
| F15 | 31 | 35.9 | 20.3 | 5.2 | 10.9 | 4.5 | 2.2 | — | — | — | — | 0.4 | — | 3.0 | 3.0 | 2.6 |
| F16 | 32 | 35.9 | 20.3 | 5.2 | 10.9 | 4.5 | 2.2 | — | — | — | — | 0.4 | — | 3.0 | 3.0 | 2.6 |

25* Same components as Example 25, except the dry weight ratio of polycarboxypolyamide resin to alkali dispersible resin was 70:30.
Footnotes for Table 3:
C-71 - soft blend acrylic copolymer
B-33 - acrylic/styrene resin
CARB - CARBITOL, a coalescing aid (diethylene glycol ethyl ether) available from Union Carbide, Danbury, Connecticut.
DPM - Dowanol DPM, a coalescing aid (dipropylene glycol methyl ether) available from Dow Chemical, Midland, Michigan.
DP - Ektasolve DP, a coalescing aid (diethylene glycol propyl ether) available from Eastman Chemical, Kingsport, Tennessee.
NMP - M-Pyrol (NMP), a coalescing aid (N-methyl-2-pyrrolidone) available from Arco Chemical, Newton Square, Pennsylvania.
PPH - Dowanol PPH, a coalescing aid (propylene glycol phenyl ether) available from Dow Chemical, Midland, Michigan.
DPnB - Dowanol DPnB, a coalescing aid (dipropylene glycol n-butyl ether) available from Dow Chemical, Midland, Michigan.
KP-140 - tributoxy ethyl phosphate, a coalescing aid, available from FMC Corp., Newark, Delaware.
P-226 - Plasthall 226, a coalescing aid (dibutoxy ethoxy ethyl adipate) available from C. P. Hall, Chicago, Illinois.
ZAC - Zinc ammonium carbonate (15% ZnO), an ionic crosslinker available from Hydrite Chemical, Milwaukee, Wisconsin.
AC316 - 35% aqueous concentration of an oxidized polyethylene available from Allied-Signal Corp., Morristown, New Jersey.
E-43 - 40% aqueous concentration of Epolene E-43 - an oxidized polypropylene available from Eastman Chemical, Kingsport, Tennessee.

The floor finish compositions of Examples F1–F16 were tested for scuff and black heel mark resistance, gloss and recoat properties. The results are set forth in Table 4 below.

The following abbreviations and terms are used as indicators of position on scales of ratings used in the various tests reported in the Table 4, where "Poor" is the lowest rating and "Excellent" the highest rating. For example: a 5-point scale includes P, F, G, VG, Exc; a 9-point scale includes P, P-F, F, F-G, G, G-VG, VG, VG-Exc, Ex, wherein P=Poor; P-F=Poor to Fair; F=Fair; F-G=Fair to Good; G=Good; G-VG=Good to Very Good; VG=Very Good; VG-Exc=Very Good to Excellent; and Exc=Excellent.

Test Methods

The performance of the floor finish formulations was tested relative to controls in the standard test methods in use in the industry. These are under the jurisdiction of ASTM Committee D-21 on Polishes, and are collected in Annual Book of ASTM Standards, Section 15, Volume 15.04. The standard test procedures used (along with the appropriate polish performance property) included: Tile Coating Procedure—ASTM D1436; Gloss—ASTM D 523; and Recoatability—ASTM D 3153.

Scuff and Black Heel mark resistance properties were determined using an internal test method developed to simulate the results obtainable from the individual ASTM test methods for mark resistance (D 3714) and scuff resiscoated tiles were aged in a CTH [constant temperature (72° F.+2° C.) and humidity (52%+2%)] room for 18 hours before the coatings were subjected to a bombardment of 5 cm×5 cm rubber cubes (the cubes are composed of a carbon black loaded crosslinked natural rubber). The coated tiles were placed coating side toward a hexagonal shaped chamber containing 6 rubber cubes. A coated tile can be placed at each of the six faces of the chamber. The chamber was rotated at 60 rpm in a clockwise direction for 22 sec., stopped, and then rotated at 60 rpm in a counter-clockwise direction for 22 sec. This represented 1 cycle. The coatings were subjected to the rubber cube bombardment for cycles before visual assessment and rating of scuff and black heel mark resistance was made.

TABLE 4

| Floor Comp. | Resistance to Scuff & BHM | White tile Gloss I | | Recoat Properties |
|---|---|---|---|---|
| | | 20E | 60E | |
| F1 | Excellent | 41 | 82 | Good |
| F2 | Very Good | 49 | 87 | Excellent |
| F3 | Very Good | 47 | 85 | Excellent |
| F4 | Very Good–Good | 37 | 79 | Good |
| F5 | Very Good–Good | 40 | 82 | Good |
| F6 | Very Good–Good | 41 | 82 | Good |
| F7 | Very Good–Good | 62* | 93* | Good–Fair |
| F8 | Very Good–Good | 28 | 72 | Good |

TABLE 4-continued

| Floor Comp. | Resistance to Scuff & BHM | White tile Gloss I 20E | 60E | Recoat Properties |
|---|---|---|---|---|
| F9 | Very Good–Good | 27 | 72 | Good |
| F10 | Good | 22 | 66 | Good–Fair |
| F11 | Good–Fair | 24 | 68 | Good–Fair |
| F12 | Fair | 61* | 93* | Good |
| F13 | Fair–Poor | 61* | 91* | Good–Fair |
| F14 | Fair–Poor | 61* | 91* | Good–Fair |
| F15 | Fair–Poor | 56* | 89* | Good–Fair |
| F16 | Poor | 66* | 97* | Good–Fair |

I Gloss - white tile VCT 4 Coat (Factory waxed vinyl composition tile available from Kentile, Inc., Chicago, Illinois)
*Gloss - white tile HV 2 Coat (Factory waxed homogeneous vinyl tile available from Kentile, Inc.)
BHMR - Black heel mark The data shows that the floor finish compositions of this invention provided excellent to good scuff and black heel mark resistance except when the relatively low Tg C-71 acrylic polymer was added.

Other variations and modifications of this invention will be obvious to those skilled in the art. This invention is not to be limited except as set forth in the following claims.

What is claimed:

1. A polymer composition useful in an aqueous dispersion comprising a blend of:
   (a) a water insoluble polycarboxypolyamide resin in an amount from about 30 to about 90 percent by weight of the blend, having an acid number from about 25 to about 60; and,
   (b) an alkali dispersible resin in an amount from about 10 to about 70 percent by weight of the blend.

2. The composition of claim 1, wherein the polycarboxypolyamide resin has a number-average molecular weight of about 2,000 to about 20,000.

3. The composition of claim 1, wherein the alkali dispersible resin has an acid number from about 75 to about 500.

4. The composition of claim 3, wherein the alkali dispersible resin has a number-average molecular weight of about 500 to about 20,000.

5. The composition of claim 4, wherein the alkali dispersible resin is selected from the group consisting of dibasic acid modified rosin and esters thereof, shellacs and polymers derived from an acid functional ethylenically unsaturated monomer and at least one other ethylenically unsaturated monomer.

6. The composition of claim 1, wherein the alkali dispersible resin has an acid number from about 100 to about 250, a number-average molecular weight of about 500 to 7,000 and is a polymer derived from an acid functional ethylenically unsaturated monomer selected from the group consisting of acrylic acid, methacrylic acid and maleic anhydride and at least one other ethylenically unsaturated monomer.

7. The composition of claim 6, wherein the alkali dispersible resin is a polymer derived from acrylic acid and at least one ethylenically unsaturated monomer selected from the group consisting of styrene, alpha-methyl styrene and $C_1$–$C_{20}$ alkyl acrylates and methacrylates.

8. The composition of claim 1, further comprising at least one nonionic or anionic surfactant in an amount from about 0.01 to about 10 percent by weight of the blend.

9. A blended polymer aqueous dispersion comprising:
   (a) a water insoluble polycarboxypolyamide resin in an amount from about 30 to about 90 percent by weight of the total solids of the dispersion, having an acid number from about 25 to about 60;
   (b) an alkali dispersible resin in an amount from about 10 to about 70 percent by weight of the total solids of the dispersion;
   (c) at least one nonionic or anionic surfactant in an amount from about 0 to about 10 percent by weight of the total solids of the dispersion;
   (d) a base in an amount from about 70 to about 150 percent of the amount required to neutralize acid functionality of the components (a) and (b); and
   (e) water.

10. The dispersion of claim 9, wherein the polycarboxypolyamide resin has a number-average molecular weight of about 2,000 to about 20,000.

11. The dispersion of claim 9, wherein the alkali dispersible resin has an acid number from about 75 to about 500.

12. The dispersion of claim 11, wherein the alkali dispersible resin has a number-average molecular weight of about 500 to about 20,000.

13. The dispersion of claim 12, wherein the alkali dispersible resin is selected from the group consisting of dibasic acid modified rosin and esters thereof, shellacs and polymers derived from an acid functional ethylenically unsaturated monomer and at least one other ethylenically unsaturated monomer.

14. The dispersion of claim 9, wherein the alkali dispersible resin has an acid number from about 100 to about 250, a number-average molecular weight of about 500 to 7,000 and is a polymer derived from an acid functional ethylenically unsaturated monomer selected from the group consisting of acrylic acid, methacrylic acid and maleic anhydride and at least one other ethylenically unsaturated monomer.

15. The dispersion of claim 14, wherein the alkali dispersible resin is a polymer derived from acrylic acid and at least one ethylenically unsaturated monomer selected from the group consisting of styrene, alpha-methyl styrene and $C_1$–$C_{20}$ alkyl acrylates and methacrylates.

16. The dispersion of claim 9, wherein the base is selected from the group consisting of hydroxides of Group I elements, amines and ammonia.

17. The dispersion of claim 16, wherein the base is ammonia.

18. A method for preparing a blended polymer aqueous dispersion comprising the steps of:
   (a) blending at a temperature from about 100° C. to about 190° C.;
      (i) a water insoluble polycarboxypolyamide resin in an amount from about 30 to about 90 percent by weight of the total solids of the dispersion, having an acid number from about 25 to about 60; and
      (ii) an alkali dispersible resin in an amount from about 10 to about 70 percent by weight of the total solids of the dispersion to form a polymer blend; and
   (b) adding to said polymer blend:
      (i) at least one nonionic or anionic surfactant in an amount from about 0 to about 10 percent by weight of the total solids of the dispersion;
      (ii) a base in an amount from about 70 to about 150 percent of the amount required to neutralize acid functionality of the components (a)(i) and (a)(ii) to form a predispersion mixture; and
      (iii) water; and
   (c) mixing said predispersion mixture at a temperature from about 25° C. to about 160° C. to form the blended polymer dispersion.

19. A method for preparing a blended polymer aqueous dispersion comprising the steps of:
  (a) blending at a temperature from about 100° C. to about 190° C.;
    (i) a water insoluble polycarboxypolyamide resin in an amount from about 30 to about 90 percent by weight of the total solids of the dispersion, having an acid number from about 25 to about 60;
    (ii) an alkali dispersible resin in an amount from about 10 to about 70 percent by weight of the total solids of the dispersion; and
    (iii) at least one nonionic or anionic surfactant in an amount from about 0 to about 10 percent by weight of the total solids of the dispersion to form a polymer blend; and
  (b) adding to said polymer blend:
    (i) a base in an amount from about 70 to about 150 percent of the amount required to neutralize acid functionality of the components (a)(i) and (a)(ii) to form a predispersion mixture; and
    (ii) water; and
  (c) mixing said predispersion mixture at a temperature from about 25° C. to about 160° C. to form the blended polymer dispersion.

20. A method for preparing a blended polymer aqueous dispersion comprising the step of:
  blending at a temperature from about 60° C. to about 160° C.;
    (i) a water insoluble polycarboxypolyamide resin in an amount from about 30 to about 90 percent by weight of the total solids of the dispersion, having an acid number from about 25 to about 60;
    (ii) an alkali dispersible resin in an amount from about 10 to about 70 percent by weight of the total solids of the dispersion;
    (iii) at least one nonionic or anionic surfactant in an amount from about 0 to about 10 percent by weight of the total solids of the dispersion;
    (iv) a base in an amount from about 70 to about 150 percent of the amount required to neutralize acid functionality of the components (i) and (ii) to form the blended polymer dispersion; and
    (v) water.

21. The method of claim 18, 19 or 20, wherein the polycarboxypolyamide resin has a number-average molecular weight of about 2,000 to about 20,000.

22. The method of claim 18, 19, or 20, wherein the alkali dispersible resin has an acid number from about 75 to about 50.

23. The method of claim 18, 19, or 20, wherein the alkali dispersible resin has a number-average molecular weight of about 500 to about 20,000.

24. The method of claim 18, 19, or 20 wherein the alkali dispersible resin is selected from the group consisting of dibasic acid modified rosin and esters thereof, shellacs and polymers derived from an acid functional ethylenically unsaturated monomer and at least one other ethylenically unsaturated monomer.

25. The method of claim 18, 19 or 20, wherein the alkali dispersible resin has an acid number from about 100 to about 250, a number-average molecular weight of about 500 to 7,000 and is a polymer derived from an acid functional ethylenically unsaturated monomer selected from the group consisting of acrylic acid, methacrylic acid and maleic anhydride and at least one other ethylenically unsaturated monomer.

26. The method of claim 25, wherein the alkali dispersible resin is a polymer derived from acrylic acid and at least one ethylenically unsaturated monomer selected from the group consisting of styrene, alpha-methyl styrene and $C_1$–$C_{20}$ alkyl acrylates and methacrylates.

27. The method of claim 18, 19, or 20, wherein the base is selected from the group consisting of metal ion hydroxide Group I elements, amines and ammonia.

28. The method of claim 27, wherein the base is ammonia.

29. A water-based coating composition comprising (i) a blended polymer aqueous dispersion comprising:
  (a) a water insoluble polycarboxypolyamide resin in an amount from about 30 to about 90 percent by weight of the total solids of the dispersion, having an acid number from about 25 to about 60;
  (b) an alkali dispersible resin in an amount from about 10 to about 70 percent by weight of the total solids of the dispersion;
  (c) at least one nonionic or anionic surfactant in an amount from about 0 to about 10 percent by weight of the total solids of the dispersion;
  (d) a base in an amount from about 70 to about 150 percent of the amount required to neutralize acid functionality of the components (a) and (b); and
  (e) water; and
    (ii) an emulsion polymer derived from at least one ethylenically unsaturated monomer.

30. The composition of claim 29, wherein said emulsion polymer is comprised of at least two ethylenically unsaturated monomer units selected from the group consisting of styrene, alpha-methyl styrene, $C_1$–$C_{20}$ alkylacrylates and methacrylates and methacylic acid in a latex system.

31. The composition of claim 30, wherein the polycarboxypolyamide resin has a number-average molecular weight of about 2,000 to about 20,000.

32. The composition of claim 30, wherein the alkali dispersible resin has an acid number from about 75 to about 500.

33. The composition of claim 32, wherein the alkali dispersible resin has a number-average molecular weight of about 500 to about 20,000.

34. The composition of claim 33, wherein the alkali dispersible resin is selected from the group consisting of dibasic acid modified rosin and esters thereof, shellacs and polymers derived from an acid functional ethylenically unsaturated monomer and at least one other ethylenically unsaturated monomer.

35. The composition of claim 30, wherein the alkali dispersible resin has an acid number from about 100 to about 250, a number-average molecular weight of about 500 to 7,000 and is a polymer derived from an acid functional ethylenically unsaturated monomer selected from the group consisting of acrylic acid, methacrylic acid and maleic anhydride and at least one other ethylenically unsaturated monomer.

36. The composition of claim 35, wherein the alkali dispersible resin is a polymer derived from acrylic acid and at least one ethylenically unsaturated monomer selected from the group consisting of styrene, alpha-methyl styrene and $C_1$–$C_{20}$ alkyl acrylates and methacrylates.

37. The composition of claim 30, wherein the base is selected from the group consisting of hydroxides of Group I elements, amines and ammonia.

38. The composition of claim 37, wherein the base is ammonia.

39. A thermoset coating composition comprising (i) a blended polymer aqueous dispersion comprising:
  (a) a water insoluble polycarboxypolyamide resin in an amount from about 30 to about 90 percent by weight of the total solids of the dispersion, having an acid number from about 25 to about 60;

(b) an alkali dispersible resin in an amount from about 10 to about 70 percent by weight of the total solids of the dispersion;
(c) at least one nonionic or anionic surfactant in an amount from about 0 to about 10 percent by weight of the total solids of the dispersion;
(d) a base in an amount from about 70 to about 150 percent of the amount required to neutralize acid functionality of the components (a) and (b); and
(e) water; and
(ii) a crosslinking agent.

40. A paper sizing composition comprising (i) a blended polymer aqueous dispersion comprising:
(a) a water insoluble polycarboxypolyamide resin in an amount from about 30 to about 90 percent by weight of the total solids of the dispersion, having an acid number from about 25 to about 60;
(b) an alkali dispersible resin in an amount from about 10 to about 70 percent by weight of the total solids of the dispersion;
(c) at least one nonionic or anionic surfactant in an amount from about 0 to about 10 percent by weight of the total solids of the dispersion;
(d) a base in an amount from about 70 to about 150 percent of the amount required to neutralize acid functionality of the components (a) and (b); and
(e) water; and
(ii) starch.

41. A resin supported emulsion polymer in a latex system prepared by the process comprising polymerizing ethylenically unsaturated monomers in the presence of a blended polymer aqueous dispersion comprising:
(a) a water insoluble polycarboxypolyamide resin in an amount from about 30 to about 90 percent by weight of the total solids of the dispersion, having an acid number from about 25 to about 60;
(b) an alkali dispersible resin in an amount from about 10 to about 70 percent by weight of the total solids of the dispersion;
(c) at least one nonionic or anionic surfactant in an amount from about 0 to about 10 percent by weight of the total solids of the dispersion;
(d) a base in an amount from about 70 to about 150 percent of the amount required to neutralize acid functionality of the components (a) and (b); and
(e) water.

42. A floor-finish latex system composition comprising
(i) a blended polymer aqueous dispersion comprising:
(a) a water insoluble polycarboxypolyamide resin in an amount from about 30 to about 90 percent by weight of the total solids of the dispersion, having an acid number from about 25 to about 60;
(b) an alkali dispersible resin in an amount from about 10 to about 70 percent by weight of the total solids of the dispersion;
(c) at least one nonionic or anionic surfactant in an amount from about 0 to about 10 percent by weight of the total solids of the dispersion;
(d) a base in an amount from about 70 to about 150 percent of the amount required to neutralize acid functionality of the components (a) and (b); and
(e) water;
(ii) an emulsion polymer derived from at least one ethylenically unsaturated monomer;
(iii) at least one coalescing aid; and
(iv) a wax or wax dispersion.

43. The composition of claim 42, wherein said emulsion polymer is derived from at least two ethylenically unsaturated monomers selected from the group consisting of styrene, alpha-methyl styrene, $C_1$–$C_{20}$ alkylacrylates and methacrylates and methacrylic acid in a latex system and wherein said emulsion polymer has a Tg (Jordan) of from about 50° C. to 100° C., and there is from about 5% to 30% by weight of methacrylic acid present based on the total weight of the monomers.

44. The composition of claim 43, wherein the polycarboxypolyamide resin has a number-average molecular weight of about 2,000 to about 20,000.

45. The composition of claim 43, wherein the alkali dispersible resin has an acid number from about 75 to about 500.

46. The composition of claim 45, wherein the alkali dispersible resin has a number-average molecular weight of about 500 to about 20,000.

47. The composition of claim 46, wherein the alkali dispersible resin is selected from the group consisting of dibasic acid modified rosin and esters thereof, shellacs and polymers derived from an acid functional ethylenically unsaturated monomer and at least one other ethylenically unsaturated monomer.

48. The composition of claim 44, wherein the alkali dispersible resin has an acid number from about 100 to about 250, a number-average molecular weight of about 500 to 7,000 and is a polymer derived from an acid functional ethylenically unsaturated monomer selected from the group consisting of acrylic acid, methacrylic acid and maleic anhydride and at least one other ethylenically unsaturated monomer.

49. The composition of claim 48, wherein the alkali dispersible resin is a polymer of acrylic acid and at least one ethylenically insatturated monomer selected from the group consisting of styrene, alpha-methyl styrene and $C_1$–$C_{20}$ alkyl acrylates and methacrylates.

50. The composition of claim 43, wherein the base is selected from the group consisting of hydroxides of Group I elements, amines and ammonia.

51. The composition of claim 50, wherein the base is ammonia.

52. The composition of claim 43, wherein said coalescing aid is selected from the group consisting of diethylene glycol ethyl ether, dipropylene glycol methyl ether, diethylene glycol propyl ether, N-methyl-2-pyrrolidone, propylene glycol phenyl ether, dipropylene glycol n-butyl ether, tributoxy ethyl phosphate, dibutoxy ethoxy ethyl adipate, dibutyl phthalate, diethyl phthalate, butylbenzyl phthalate, dipropylene glycol dibenzoate, diethylene glycol dibenzoate, propylene glycol dibenzoate, polypropylene glycol dibenzoate, polyethylene glycol dibenzoate, isodecyl benzoate and mixtures thereof.

53. The composition of claim 45, wherein said wax or wax dispersion is selected from the group consisting of oxidized polyethylene, oxidized polypropylene and mixtures thereof.

54. The composition of claim 42 wherein the amount of emulsion polymer on a nonvolatile solids basis, is between 5% and 95% by weight of the total nonvolatile solids content based on the polymers (i) (a), (i) (b) and (ii).

55. The composition as claimed in claim 54 wherein the amount of emulsion polymer (ii) is from about 40% to about 95% by weight.

56. The composition as claimed in claim 54 wherein the amount of emulsion polymer (ii) is from about 70% to about 85% by weight.

* * * * *